United States Patent
Ozol et al.

(10) Patent No.: US 10,919,181 B2
(45) Date of Patent: Feb. 16, 2021

(54) METHODS AND APPARATUSES FOR CURING CONCRETE

(71) Applicant: Transhield, Inc., Elkhart, IN (US)

(72) Inventors: Seckin Ozol, South Bend, IN (US); Gregory L. Todt, Union, MI (US); Na Qi, Granger, IN (US)

(73) Assignee: Transhield, Inc., Elkhart, IN (US)

( * ) Notice: Subject to any disclaimer, the term of this patent is extended or adjusted under 35 U.S.C. 154(b) by 0 days.

(21) Appl. No.: 16/800,213

(22) Filed: Feb. 25, 2020

(65) Prior Publication Data

US 2020/0247007 A1    Aug. 6, 2020

Related U.S. Application Data

(62) Division of application No. 16/037,106, filed on Jul. 17, 2018, now Pat. No. 10,675,779.

(Continued)

(51) Int. Cl.
  *B28B 1/00*   (2006.01)
  *B28B 7/00*   (2006.01)
  (Continued)

(52) U.S. Cl.
  CPC .............. *B28B 11/247* (2013.01); *B28B 1/14* (2013.01); *B28B 7/368* (2013.01); *B28B 7/40* (2013.01);
  (Continued)

(58) Field of Classification Search
  CPC .... B28B 1/00; B28B 1/10; B28B 1/14; B28B 7/00; B28B 7/30; B28B 7/36;
  (Continued)

(56) References Cited

U.S. PATENT DOCUMENTS

| 1,694,588 A | 12/1928 | Finley et al. |
| 1,768,366 A | 6/1930 | McKesson |

(Continued)

FOREIGN PATENT DOCUMENTS

| DE | 1002018 | 2/1957 |
| EP | 2578395 A1 | 4/2013 |

(Continued)

OTHER PUBLICATIONS

TEAMFG, Cure Right Advantages, Apr. 2017, 1 page.
(Continued)

*Primary Examiner* — Jacob T Minskey
*Assistant Examiner* — Matthew Hoover
(74) *Attorney, Agent, or Firm* — Barnes & Thornburg LLP

(57) ABSTRACT

An apparatus for curing concrete includes a multiple layer film and an absorbent layer. The film can include pH modifying components and antiskid components. The absorbent layer can include pH modifying components. The apparatus can be applied to concrete after hydration water is applied. The apparatus can enclose concrete members during transport so as to continue the curing process during transport. The film can be used as a barrier layer between the ground and poured concrete. The apparatus can be manufactured by heating a film to its crystalline softening point, applying adhesive material to an absorbent material, and adhering the film to the absorbent material. A method of curing concrete includes pouring concrete, waiting for the (Continued)

concrete to reach the bleed stage, providing hydration water, adding a pH modifying component to the hydration water, and applying the hydration water with the pH modifying component to the poured concrete.

29 Claims, 22 Drawing Sheets
(4 of 22 Drawing Sheet(s) Filed in Color)

Related U.S. Application Data

(60) Provisional application No. 62/534,482, filed on Jul. 19, 2017, provisional application No. 62/591,817, filed on Nov. 29, 2017.

(51) Int. Cl.

| | | |
|---|---|---|
| *B28B 11/00* | (2006.01) | |
| *B32B 3/00* | (2006.01) | |
| *B32B 5/00* | (2006.01) | |
| *B32B 7/00* | (2019.01) | |
| *B32B 27/00* | (2006.01) | |
| *C04B 40/00* | (2006.01) | |
| *E04G 21/00* | (2006.01) | |
| *B28B 11/24* | (2006.01) | |
| *E04G 21/24* | (2006.01) | |
| *C04B 40/04* | (2006.01) | |
| *B28B 1/14* | (2006.01) | |
| *B28B 7/36* | (2006.01) | |
| *B28B 7/40* | (2006.01) | |
| *B28B 11/08* | (2006.01) | |
| *B32B 3/30* | (2006.01) | |
| *B32B 5/02* | (2006.01) | |
| *B32B 7/14* | (2006.01) | |
| *B32B 27/12* | (2006.01) | |
| *B32B 27/30* | (2006.01) | |
| *B32B 27/32* | (2006.01) | |
| *B32B 37/20* | (2006.01) | |
| *B32B 38/06* | (2006.01) | |
| *B32B 37/06* | (2006.01) | |
| *B32B 37/12* | (2006.01) | |

(52) U.S. Cl.
CPC ........ *B28B 11/0845* (2013.01); *B28B 11/245* (2013.01); *B32B 3/30* (2013.01); *B32B 5/022* (2013.01); *B32B 7/14* (2013.01); *B32B 27/12* (2013.01); *B32B 27/308* (2013.01); *B32B 27/32* (2013.01); *C04B 40/04* (2013.01); *E04G 21/246* (2013.01); *B32B 37/06* (2013.01); *B32B 37/1207* (2013.01); *B32B 37/203* (2013.01); *B32B 38/06* (2013.01); *B32B 2037/1215* (2013.01); *B32B 2262/0284* (2013.01); *B32B 2262/062* (2013.01); *B32B 2262/14* (2013.01); *B32B 2307/581* (2013.01); *B32B 2307/5825* (2013.01); *B32B 2307/7246* (2013.01); *B32B 2307/746* (2013.01); *B32B 2317/18* (2013.01); *B32B 2323/043* (2013.01); *B32B 2323/046* (2013.01); *B32B 2323/10* (2013.01); *B32B 2333/08* (2013.01); *B32B 2367/00* (2013.01)

(58) Field of Classification Search
CPC .......... B28B 7/368; B28B 7/40; B28B 11/00; B28B 11/08; B28B 11/084; B28B 11/0845; B28B 11/20; B28B 11/24; B28B 11/245; B28B 11/247; B32B 3/00; B32B 3/30; B32B 5/00; B32B 5/02; B32B 5/022; B32B 7/00; B32B 7/10; B32B 7/14; B32B 27/00; B32B 27/10; B32B 27/12; B32B 27/30; B32B 27/308; B32B 27/32; C04B 40/00; C04B 40/04; E04G 21/00; E04G 21/20; E04G 21/24; E04G 21/246

See application file for complete search history.

(56) References Cited

U.S. PATENT DOCUMENTS

| | | |
|---|---|---|
| 1,841,928 A | 1/1932 | Anderson |
| 1,841,931 A | 1/1932 | Weber |
| 1,992,110 A | 2/1935 | Wittenberg |
| 1,999,152 A | 4/1935 | Finley |
| 2,021,513 A | 11/1935 | Levine |
| 2,023,887 A | 12/1935 | Rood |
| 2,133,641 A | 10/1938 | Tompkins |
| 3,169,899 A | 2/1965 | Steuber |
| 3,386,854 A | 6/1968 | Sautier |
| 4,035,543 A | 7/1977 | Draper et al. |
| 4,423,694 A | 1/1984 | Senneville |
| 4,485,137 A | 11/1984 | White |
| 4,656,005 A | 4/1987 | Arpin |
| 4,822,669 A | 4/1989 | Roga |
| 4,900,377 A | 2/1990 | Redford et al. |
| 5,096,748 A | 3/1992 | Balassa |
| 5,143,780 A | 9/1992 | Balassa |
| 5,507,900 A | 4/1996 | Mohammed et al. |
| 5,549,956 A | 8/1996 | Handwerker |
| 5,611,369 A | 3/1997 | Hamann, Jr. |
| 5,780,367 A | 7/1998 | Handwerker |
| 5,816,305 A | 10/1998 | May |
| 5,843,554 A | 12/1998 | Katz |
| 5,855,978 A | 1/1999 | Handwerker |
| 5,874,150 A | 2/1999 | Handwerker |
| 5,877,097 A | 3/1999 | West et al. |
| 5,882,769 A | 3/1999 | McCormack et al. |
| 5,904,672 A | 5/1999 | LeMahieu et al. |
| 5,986,166 A | 11/1999 | Mukaida et al. |
| 6,033,757 A | 3/2000 | Murphy |
| 6,187,382 B1 | 2/2001 | Lightcap, Jr. |
| 6,713,411 B2 | 3/2004 | Cox et al. |
| 7,465,484 B2 | 12/2008 | Handwerker |
| 7,572,525 B2 | 8/2009 | McDonald |
| 7,743,729 B2 | 6/2010 | Cotter |
| 7,998,564 B2 | 8/2011 | Bliton et al. |
| 8,171,687 B2 | 5/2012 | Dellinger et al. |
| 8,532,815 B1 | 9/2013 | Ciuperca |
| 8,852,380 B2 | 10/2014 | Handwerker |
| 8,877,329 B2 | 11/2014 | Ciuperca |
| 8,951,604 B2 | 2/2015 | Hoffmann et al. |
| 9,249,311 B2 | 2/2016 | Richardson, Sr. et al. |
| 9,255,037 B2 | 2/2016 | Christidis et al. |
| 2002/0031964 A1 | 3/2002 | Reisdorf et al. |
| 2002/0068081 A1 | 6/2002 | Fontenot et al. |
| 2003/0077471 A1 | 4/2003 | Tucker |
| 2005/0042957 A1 | 2/2005 | McDonald et al. |
| 2005/0214507 A1 | 9/2005 | McDonald |
| 2006/0019064 A1 | 1/2006 | McDonald |
| 2006/0099338 A1 | 5/2006 | Boelz et al. |
| 2008/0054519 A1 | 3/2008 | McDonald et al. |
| 2008/0193716 A1 | 8/2008 | Arthurs et al. |
| 2008/0258341 A1 | 10/2008 | Parkes et al. |
| 2009/0148596 A1 | 6/2009 | Carroll et al. |
| 2009/0165942 A1 | 7/2009 | Nowicki et al. |
| 2009/0169849 A1 | 7/2009 | Bliton et al. |
| 2009/0241453 A1 | 10/2009 | Dellinger et al. |
| 2010/0025886 A1 | 2/2010 | Carroll |
| 2010/0038818 A1 | 2/2010 | McDonald |
| 2013/0323459 A1 | 12/2013 | Barrego |
| 2014/0234563 A1 | 8/2014 | Bone et al. |
| 2014/0333010 A1 | 11/2014 | Ciuperca |

(56) References Cited

U.S. PATENT DOCUMENTS

2015/0361625 A1   12/2015   Ciuperca
2016/0221216 A1   8/2016   Richards et al.

FOREIGN PATENT DOCUMENTS

| | | |
|---|---|---|
| GB | 957684 | 5/1964 |
| JP | 811122 A | 1/1996 |
| JP | 1142652 A | 2/1999 |

OTHER PUBLICATIONS

Sika Corporation, UltraCureNCF, Photograph of a sample of UltraCure available from Sika Corporation, Apr. 2017, 1 page.

Sika Corporation, Concrete Curing and Floor Protection Sika UltraCure & Sika EZcover, Apr. 2017, 8 pages.

Sika Corporation, Sika UltraCure NCF, Product Data Sheet, Apr. 2017, 2 pages.

Strescore Inc., Producers of Corefloor Prestressed Hollowcore Slab, 2017, 28 pages.

National Precast Concrete Association, Curing Wet-Cast Precast Concrete, Apr. 2013, 5 pages.

ASTM International, Standard Specification for Sheet Materials for Curing Concrete: Designation C 171-03, 2003, 2 pages.

ASTM International, Standard Test Methods for Water Vapor Transmission of Materials: Designation E96/E96M-10, Feb. 2013, 12 pages.

ASTM International, Standard Practice for Petrographic Examination of Hardened Concrete: Designation C856-04, 2004, 17 pages.

ASTM International, Standard Specification for Coal Fly Ash and Raw or Calcined Natural Pozzolan for Use in Concrete; Designation C 618-05, 2005, 3 pages.

ASTM International, Standard Specification for Portland Cement: Designation C150-07, 2007, 8 pages.

Mocon, Inc., ASTM E96 vs. F1249 Which Provides More Accurate Test Results, May 16, 2017, 6 pages.

Maixner, Robert and Michelle Stevens, Mocon, Inc., Testing Water Vapor Transmission Rates for Flexible Barrier Materials Including Metalized Structures, 2002, 5 pages.

Kosmatka, Steven H. and Michelle L. Wilson, Design and Control of Concrete Mixtures, 16th Edition, Portland Cement Association, 2016, pp. 261-263, 272-273, 454.

European Patent Office, International Search Report issued in PCT/US2018/042574, dated Jan. 16, 2019, 8 pages.

European Patent Office, Written Opinion issued in PCT/US2018/042574, dated Jan. 16, 2019, 13 pages.

European Patent Office, Invitation to Pay Additional Fees issued in PCT/US2018/042574, dated Nov. 20, 2018, 13 pages.

Polyprint, Polyprint Water Vapor Transmission Rate (www.polyprint.com), 2008, 3 pages.

| | Layer 1 | Layer 2 | Layer 3 | Layer 4 | Layer 5 | Layer 6 |
|---|---|---|---|---|---|---|
| | Fig 1 / Film 10 / Layer 11 | Fig 1 / Film 10 / Layer 12 | Fig 1 / Film 10 / Layer 13 | Layer 13A | Layer 12A | Layer 11A |
| Embodiment 1 | 5% coloring component, 80% EBA, 5% anti-skid MB, 10% LLDPE | 15% coloring component, 70% HDPE, 15%LLDPE | 100% Vistamaxx 3020 FL | same as layer 3 | same as layer 2 | same as layer 1 |
| Embodiment 1 (range) | 5-20% coloring component, 1-20% anti-skid, 50-90% EBA, 1-25% LLDPE | 5-20% coloring component, 50-90% HDPE, 1-25%LLDPE | 100% Vistamaxx 3020 FL | same as layer 3 | same as layer 2 | same as layer 1 |
| Embodiment 2 | 5% coloring component, 80% EBA, 5% anti-skid MB, 10% PH MB | 15% coloring component, 70% HDPE, 15%LLDPE | 100% Vistamaxx 3020 FL | same as layer 3 | same as layer 2 | same as layer 1 |
| Embodiment 2 (range) | 5-20% coloring component, 1-20% anti-skid, 50-90% EBA, 1-25% PH MB | 5-20% coloring component, 50-90% HDPE, 1-25% LLDPE | 100% Vistamaxx 3020 FL | same as layer 3 | same as layer 2 | same as layer 1 |
| Embodiment 3 | 5% coloring component, 5% anti-skid component, 67.5% EBA, 22.5% PH MB | 15% coloring component, 70% HDPE, 15% LLDPE | 60% LLDPE, 40% Vistamaxx 3020 FL | same as layer 3 | same as layer 2 | same as layer 1 |
| Embodiment 3 (range) | 5-20% coloring component, 1-20% anti-skid, 50-90% EBA, 1-25% PH MB | 5-20% coloring component, 50-90% HDPE, 1-25%LLDPE | 0-80% LLDPE, 20-100% Vistamaxx 3020 FL | same as layer 3 | same as layer 2 | same as layer 1 |
| Embodiment 7 | 10% coloring component, 3% anti-skid component, 10% LDPE, 76% LLDPE, 1% PH MB | 7% coloring component, 73% HDPE, 20% LLDPE | 60% LLDPE, 40% Vistamaxx 3020 FL | same as layer 3 | same as layer 2 | same as layer 1 |
| Embodiment 7 (range) | 1-20% coloring component, 1-10% anti-skid component, 0-90% LDPE, 0-90%LLDPE, 1-20%PH MB | 1-20% coloring component, 20-90% HDPE, 0-90%LLDPE | 0-80% LLDPE, 20-100% Vistamaxx 3020 FL | same as layer 3 | same as layer 2 | same as layer 1 |
| Embodiment 8 | 9% coloring component, 15% anti-skid component, 10% LDPE, 65% LLDPE, 1% PH MB | 8% coloring component, 72% HDPE, 20% LLDPE | 60% LLDPE, 40% Vistamaxx 3020 FL | same as layer 3 | same as layer 2 | same as layer 1 |
| Embodiment 8 (range) | 1-20% coloring component, 1-20% anti-skid component, 0-90% LDPE, 0-90%LLDPE | 1-20% coloring component, 20-90% HDPE, 0-90%LLDPE | 0-80% LLDPE, 20-100% Vistamaxx 3020 FL | same as layer 3 | same as layer 2 | same as layer 1 |
| Embodiment 9 | 10% coloring component, 3% anti-skid component, 10% LDPE, 76% LLDPE, 1% PH MB | 7% coloring component, 73% HDPE, 20% LLDPE | 60% LLDPE, 40% Vistamaxx 3020 FL | same as layer 3 | same as layer 2 | same as layer 1 |
| Embodiment 9 (range) | 5-20% coloring component, 1-5% anti-skid component, 0-20% LDPE, 50-80%LLDPE, 1-5%PH MB | 5-20% coloring component, 50-90% HDPE, 0-20%LLDPE, 0-10% PE-PP-co-polymer | 0-80% LLDPE, 20-100% Vistamaxx 3020 FL | same as layer 3 | same as layer 2 | same as layer 1 |
| FILM 200 | Layer 201 | Layer 202 | Layer 203 | | | |
| Embodiment 4 | 10% coloring component, 5% anti-skid MB, 20%LLDPE, 65% HDPE | 10% coloring component, 60% LLDPE, 30% HDPE | 5% coloring component, 5% PH MB, 20% LLDPE, 70% HDPE | | | |

FIG. 10

| | Layer 1 | Layer 2 | Layer 3 | Layer 4 | Layer 5 | Layer 6 |
|---|---|---|---|---|---|---|
| Embodiment 4 (range) | 5-20% coloring component, 1-20% anti-skid, 5-20% LLDPE, 50-85% HDPE | 5-20% coloring component, 50-85%LLDPE, 20-45% HDPE | 0-20% coloring component, 10-80% HDPE, 5-50% PH MB, 5-85% LLDPE | | | |
| Embodiment 10 | 10% coloring component, 3% anti-skid MB, 60%LLDPE, 27% HDPE | 10% coloring component, 20% LLDPE, 70% HDPE | 0% coloring component, 1% PH MB, 66% LLDPE, 33% HDPE | | | |
| Embodiment 10 (range) | 1-10% coloring component, 1-10% anti-skid, 0-90% LLDPE, 0-90% HDPE | 1-20% coloring component, 0-90%LLDPE, 20-90% HDPE | 0-20% coloring component, 0-90% HDPE, 1-20% PH MB, 0-90% LLDPE | | | |
| Embodiment 11 | 10% coloring component, 5% anti-skid MB, 60%LLDPE, 25% HDPE | 10% coloring component, 20% LLDPE, 70% HDPE | 50% PH MB, 50% EBA | | | |
| Embodiment 11 (range) | 1-10% coloring component, 1-10% anti-skid, 0-90% LLDPE, 0-90% HDPE | 1-20% coloring component, 0-90%LLDPE, 20-90% HDPE | 0-20% coloring component, 0-90% HDPE, 5-50% PH MB, 5-50% EBA | | | |
| FILM 300 | Layer 301 | Layer 302 | Layer 303 | | | |
| Embodiment 5 | 10% coloring component, 5% anti-skid MB, 65% EAA, 20% HDPE | 10% coloring component, 10% LDPE, 60% HDPE, 20%LLDPE | 50% EBA, 50%PH MB | | | |
| Embodiment 5 (range) | 5-20% coloring component, 1-20% anti-skid, 50-90% EAA, 0-20% HDPE | 5-20% coloring component, 5-20% LDPE, 10-60% HDPE, 10-60% LLDPE | 1-60% PH MB, 40-99% EBA | | | |
| FILM 400 | Layer 401 | Layer 402 | Layer 403 | | | |
| Embodiment 6 | 5% anti-skid MB, 10%coloring component, 20%EBA, 65%LLDPE | 10% coloring component, 10%LDPE, 60% HDPE, 20%LLDPE | 30% PH MB, 70% EBA | | | |
| Embodiment 6 (range) | 5-20% coloring component, 1-20% anti-skid, 50-85% LLDPE, 5-44% EBA | 5-20% coloring component, 5-20%LLDPE, 10-60% HDPE,10-60%LLDPE | 1-60% PH MB, 40-99% EBA | | | |

FIG. 10
(Cont'd)

METHODS AND APPARATUSES FOR CURING CONCRETE

This application is a divisional application claiming priority from U.S. patent application Ser. No. 16/037,106 filed Jul. 17, 2018, which claims priority from U.S. Provisional Patent Application Ser. No. 62/534,482 filed Jul. 19, 2017 and U.S. Provisional Patent Application Ser. No. 62/591,817 filed Nov. 29, 2017. The disclosures of all of the above-referenced applications are hereby incorporated in their entireties by reference. The present invention relates to methods and apparatuses for curing concrete.

BACKGROUND AND SUMMARY OF THE INVENTION

Concrete undergoes a curing process after it is poured. Immediately after pouring, the concrete is in a plastic state. From this state, the poured concrete begins to transform from a fluid state to a solid state, becoming more dense and rigid. As this occurs, the concrete begins to "bleed," i.e. solid particles in the concrete begin to settle and water in the concrete begins to migrate upward to the surface.

Concrete must have enough time under the proper conditions to cure to the desired strength. Properly cured concrete is more resistant to stress, abrasion and mechanical issues resulting from repeated freezing and thawing. Properly cured concrete is also more resistant to scaling, creep and failure. Problems with concrete frequently start at the surface. Properly curing the top 3 inches of a concrete member and, in particular, the top 3/16 of an inch, can prevent many of these problems.

Proper hydration of curing concrete contributes to proper curing. One known method for hydrating curing concrete is to spray it with water and cover it with a curing blanket. Generally speaking, curing blankets are used to maintain moisture in poured concrete during the curing process. Examples of such products are discussed in U.S. Pat. Nos. 1,694,588, 8,852,380, 7,572,525, 7,998,564, 5,780,367 and 5,611,369.

The present invention includes multiple methods and apparatuses for curing concrete. These methods and apparatuses include, but are not limited to, (1) curing covers for poured concrete members, (2) curing covers for use during the storage, transportation and after installation of concrete structures, (3) methods of making curing covers, (4) methods of altering the pH of the water used to hydrate curing concrete members, and (5) barrier layers for poured concrete.

In one embodiment of the present invention, an apparatus for curing concrete includes a film having a first outer layer, a second outer layer, a first inner layer, a second inner layer, a third inner layer, a fourth inner layer and an absorbent layer. The first and second outer layers include linear low density polyethylene. The first inner layer is adjacent the first outer layer and the second inner layer is adjacent the second outer layer. The first and second inner layers include linear low density polyethylene and high density polyethylene. The third inner layer is adjacent the first inner layer and the fourth inner layer is adjacent the second inner layer and the third inner layer. The third and fourth inner layers include an ethylene polypropylene copolymer. The absorbent layer includes a nonwoven fabric. An adhesive material adheres the second outer layer of the film to the absorbent layer.

In one embodiment, the first outer layer of the film includes an antiskid component. In one embodiment, the kinetic and static coefficients of friction of the first outer layer of the film are each at least 0.7.

In another embodiment, the nonwoven fabric includes a plurality of raised areas and a plurality of recessed areas and the adhesive adheres the second outer layer of the film to the raised areas of the nonwoven fabric.

According to another embodiment, the apparatus further includes a pH modifying component for modifying the pH of water used to hydrate the curing concrete. The pH modifying component may be incorporated into the film and/or the absorbent layer. In certain embodiments, the pH modifying component includes calcium oxide. The pH of water used to hydrate the curing concrete may be about 11 to about 13.

In another embodiment, the film forms a water vapor barrier on one side of the absorbent layer. In certain embodiments, the water vapor transmission rate of the apparatus from the absorbent layer through the second inner layer of the film is less than 10 grams per square meter per day.

In other embodiments, the apparatus has a puncture resistance of at least 14 pounds. In some embodiments, the apparatus has an Elmendorf tear strength of at least 1,000 grams. In certain embodiments, the first and second outer layers of the film include ethylene butyl acrylate.

In another embodiment of the present invention, a method of manufacturing an apparatus for curing concrete includes providing a film, providing an absorbent material, the absorbent material having a plurality of raised surfaces and a plurality of recessed areas, providing an adhesive material, heating the film to its crystalline softening point, applying the adhesive material to the raised surfaces of the absorbent material, and adhering the film to the raised surfaces of the absorbent material so as to form a plurality of pockets between the film and the recessed areas of the absorbent material.

In one embodiment of the invention, the resulting apparatus has a water vapor transmission rate from the absorbent layer through the film of less than 10 grams per square meter per day.

In other embodiments, the method further includes forming the apparatus into an enclosure for enclosing a concrete member during curing.

In other embodiments, the method includes incorporating a pH modifying component into the apparatus. The pH modifying component can be incorporated into the film, the absorbent material, and/or the adhesive material.

In one embodiment of the invention, the absorbent material and adhesive material are laminated together. In another embodiment, the adhesive material is a hot melt adhesive. In certain embodiments, the resulting apparatus has a saturated bond strength of at least about 22 grams per inch.

In another embodiment of the present invention, a method of curing of concrete includes pouring concrete to a desired shape to form a concrete member, waiting for the concrete to reach the bleed stage, applying hydration water to the surface of the poured concrete, and applying an apparatus over the surface of the concrete after applying the hydration water, the apparatus including a film, an absorbent layer adhered to the film and a pH modifying component for modifying the pH of the hydration water.

In one embodiment, the apparatus further includes a pH modifying component for modifying the pH of water used to hydrate the curing concrete. The pH modifying component may be incorporated into the film and/or the absorbent layer. In certain embodiments, the pH modifying component includes calcium oxide. The pH of water used to hydrate the curing concrete may be about 11 to about 13. In one embodiment, the method includes maintaining the pH of the hydration water above about 11 for at least 7 days.

In another embodiment, the film forms a water vapor barrier on one side of the absorbent layer. In some embodiments, the water vapor transmission rate of the apparatus from the absorbent layer through the film is less than 10 grams per square meter per day.

According to another embodiment of the invention, the film includes an antiskid component. In certain embodiments, the apparatus is configured to enclose the concrete member.

In yet another embodiment of the invention, the step of applying the apparatus to the concrete member includes enclosing the concrete member in the apparatus and transporting the enclosed concrete member to a location other than the location at which it was poured, thereby continuing to cure the concrete member during transport.

In another embodiment of the present invention, an apparatus for providing a barrier layer between the ground and concrete to be poured on the ground includes a film having a first outer layer, a second outer layer, a first inner layer, a second inner layer, a third inner layer and a fourth inner layer. The first and second outer layers include linear low density polyethylene. The first inner layer is adjacent the first outer layer and the second inner layer is adjacent the second outer layer. The first and second inner layers include linear low density polyethylene and high density polyethylene. The third inner layer is adjacent the first inner layer and the fourth inner layer is adjacent the second inner layer and the third inner layer. The third and fourth inner layers include an ethylene polypropylene copolymer.

In another embodiment of the present invention, a method of curing of concrete includes pouring concrete to a desired shape to form a concrete member, waiting for the concrete to reach the bleed stage, providing hydration water, adding a pH modifying component to the hydration water, and applying the hydration water with the pH modifying component to the surface of the poured concrete.

In one embodiment of the invention, the pH modifying component is calcium oxide. In certain embodiments, the pH modifying component modifies the pH of the hydration water to about 11 to about 13.

In another embodiment, the method further includes applying an apparatus over the surface of the concrete member after applying the hydration water with the pH modifying component, the apparatus including a film and an absorbent layer adhered to the film. In one embodiment, the film forms a water vapor barrier on one side of the absorbent layer. In another embodiment, the water vapor transmission rate of the apparatus from the absorbent layer through the film is less than 10 grams per square meter per day. In certain embodiments, the film includes an antiskid component. In other embodiments, the apparatus is configured to enclose the concrete member.

These and other features of the present invention will be apparent to one of ordinary skill in the art from the following description and accompanying drawings.

BRIEF DESCRIPTION OF THE DRAWINGS

The patent or application file contains at least one drawing executed in photograph and/or in color. Copies of this patent or patent application with photographs and color drawings will be provided by the Office upon request and payment of the necessary fee.

FIG. 10 is a spreadsheet listing components of films that are components of concrete curing covers according to embodiments of the present invention.

DETAILED DESCRIPTION OF EMBODIMENTS OF THE INVENTION

One embodiment of a concrete curing cover according to the present invention includes three sections: a film, an absorbent layer and adhesive. One embodiment of the present invention utilizes "collapsed bubble" (CB) technology known by those skilled in the art of blown film extrusion to form the film section of the concrete curing cover. This embodiment produces a multilayer film having sufficient strength to form the concrete curing cover into custom-shaped covers that can withstand the rigors of handling and transporting precast concrete structures for in-transit curing and for use after installation of the concrete member. The film also has sufficient strength to resist tearing that can result from installation and removal from poured concrete surfaces and from persons walking on the installed cover.

Figure 1:
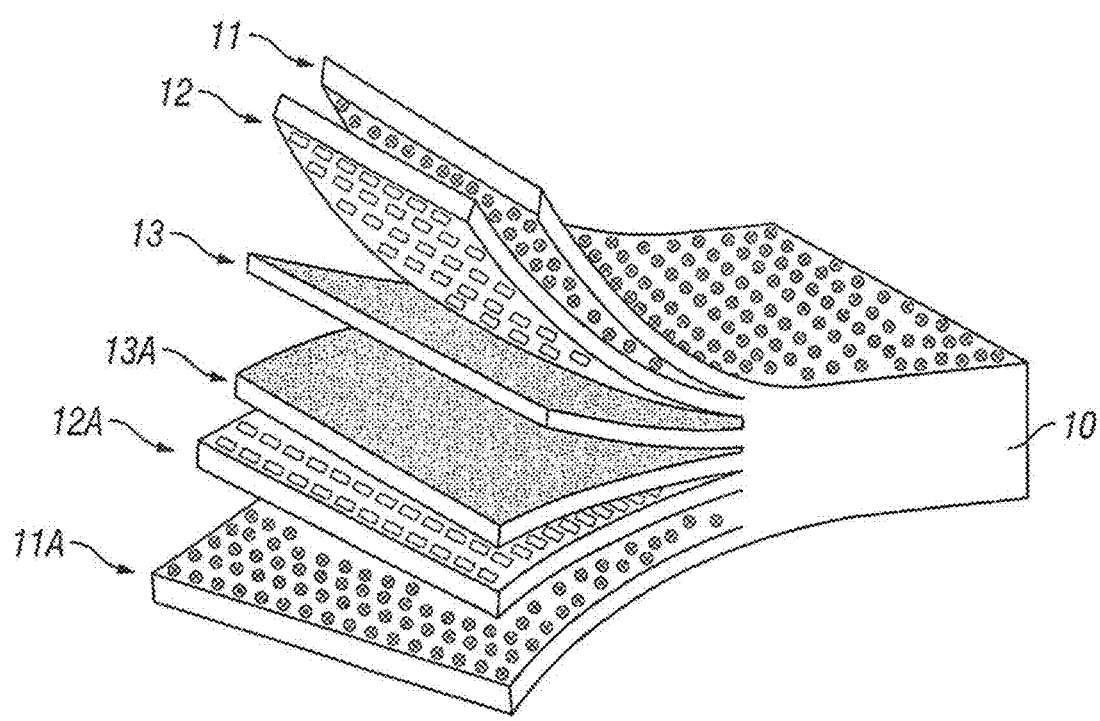
FIG. 1 is a partially exploded perspective view of a film that is a component of a concrete curing cover according to embodiments of the present invention.

FIG. 1 is a partially exploded perspective view of a film that is a component of a concrete curing cover according to one embodiment of the present invention. As shown in FIG. 1, film 10 includes a first outer layer 11, a first inner layer 12, a second inner layer 13, a third inner layer 13A, a fourth inner layer 12A and a second outer layer 11A.

In the embodiment shown, first outer layer 11 and second outer layer 11A are constructed from linear low density polyethylene (LLDPE) in an ethylene butyl acrylate (EBA) matrix with coloring and antiskid components. "Matrix" as used in the preceding sentence means that at least 50% of the polymer content of first outer layer 11 and second outer layer 11A is EBA. As discussed in greater detail below, the coloring and antiskid components can be supplied in the form of a masterbatch. In certain embodiments of the invention, first outer layer 11 and second outer layer 11A include about 50% to about 90% EBA, about 1% to about 25% LLDPE, about 5% to about 20% of a coloring component and about 1% to about 20% of an antiskid component. In one embodiment of the invention, first outer layer 11 and second outer layer 11A are constructed from 80% EBA, 10% LLDPE, 5% of a coloring component and 5% of an antiskid component. Because EBA is an extremely polar polymer, it will attract and cluster water on the surface of first outer layer 11 and second outer layer 11A. First outer layer 11 and second outer layer 11A can also be constructed in whole or in part from other polar polymers, such as, for example, ethylene acrylic acid (EAA).

First inner layer 12 and fourth inner layer 12A are, in the embodiment shown, constructed from LLDPE in a high density polyethylene (HDPE) matrix. "Matrix" as used in the preceding sentence means that at least 50% of the polymer content of first inner layer 12 and fourth inner layer 12A is HDPE. In one embodiment of the invention, first inner layer 12 and fourth inner layer 12A are about 1% to about 25% LLDPE, about 50% to about 90% HDPE and about 5% to about 20% of a coloring component. In one embodiment of the invention, first inner layer 12 and fourth inner layer 12A are constructed from 70% HDPE, 15% LLDPE and 15% of a coloring component.

Second inner layer 13 and third inner layer 13A are, in the embodiment shown, constructed from an ethylene polypropylene copolymer. In one embodiment of the present invention, the ethylene polypropylene copolymer is Vistamaxx 3020 FL, available from Exxon Mobil Corporation of Irving, Tex.

Use of EBA or EAA results in a high coefficient of friction on the outer surface of film 10. As discussed above, first outer layer 11 and/or second outer layer 11A may also include a component including an additive to provide texture to those layers, thereby producing antiskid properties. In the examples herein, an antiskid component is in the form of a master batch containing about 45% to about 55% of an antiskid agent and the remainder LDPE. In one embodiment of the present invention, the antiskid agent includes a partially cross-linked polyethylene polymer, such as Polybatch MAS 25 available from A. Schulman, Inc. of Fairlawn, Ohio. In another embodiment of the present invention, the antiskid agent is #10030-12 available from Colortech, Inc. of Morristown, Tenn. In one embodiment of the present invention, the static coefficient of friction of first outer layer 11 and second outer layer 11A is about 1.770 and the kinetic coefficient of friction is about 1.580. Even without including an antiskid component, in one embodiment of the present invention the static coefficient of friction of first outer layer 11 and second outer layer 11A is about 1.400 and the kinetic coefficient of friction is about 1.150.

In certain embodiments of the invention, film 10 is bright white, which will reflect sunlight and aid in temperature control. Film 10 can also include an optical brightener to increase visibility of film 10. In other embodiments of the invention, film 10 is black so as to absorb heat and warm the curing concrete. In certain embodiments of the invention, the desired color is achieved by adding a coloring component. In the examples given herein, the coloring component is in the form of a masterbatch containing between about 50% and about 65% of a color modifying agent, about 10% UV stabilizers and the remainder LDPE. In certain embodiments, the color modifying agent constitutes 62% of the masterbatch.

Figure 2:
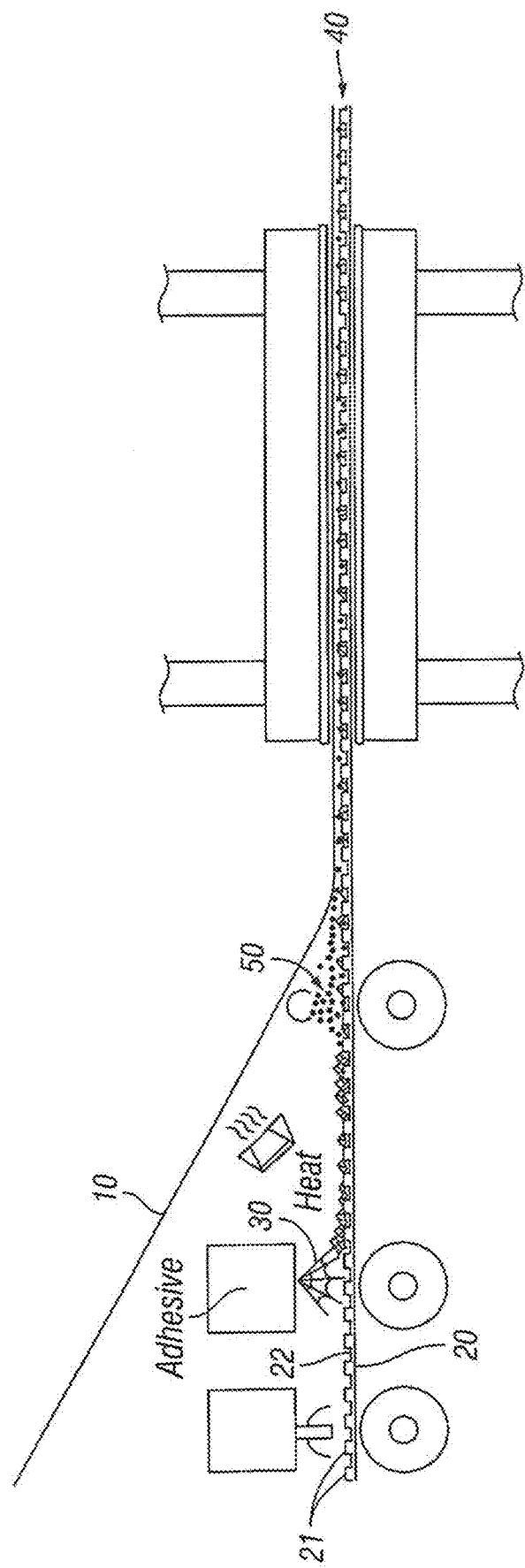
FIG. 2 is a schematic view of a concrete curing cover manufacturing process according to embodiments of the present invention.

As shown in FIG. 2, film 10 is adhered to an absorbent layer 20 with the assistance of adhesive 30 to produce concrete curing cover 40. In one embodiment of the invention, absorbent layer 20 is a nonwoven layer selected from a group including, but not limited to, spunlaced or hydroentangled composites containing both polyester (PET) fibers and highly absorbent synthetics such as rayon, viscos, lyocell and/or similar materials. In one embodiment of the invention, absorbent layer 20 is at least 20% viscose fiber. In another embodiment of the invention, absorbent layer 20 is about 70% viscose fiber and about 30% polyester fiber. Absorbent layer 20 in the embodiment shown Is embossed or otherwise processed to form raised surfaces 21 and recessed areas or valleys 22. Raised surfaces 21 can be any of a number of configurations such as, for example, squares, circles or other patterns. In certain embodiments, absorbent layer 20 can include apertures to assist with absorbing and retaining water. Absorbent layer 20 may also be treated with additives, such as Techsurf-15560 available from Techmer PM, LLC of Batavia, Ill., to improve hydrophilicity.

In one embodiment of the invention, adhesive 30 is a hot melt thermoplastic rubber adhesive, such as, for example, AL-1262 or AL 34-149-1 made by Adherent Laboratories, Inc. of St. Paul, Minn. These are exterior waterproof adhesives. In certain embodiments of the invention, adhesive 30 has a shear adhesion failure temperature of at least about 140° F.

FIG. 2 illustrates a method of manufacturing concrete curing cover 40 according to one embodiment of the present invention. This method utilizes a low pressure nip lamination process known in the art. Adhesive 30 is applied to raised surfaces 21 of absorbent layer 20. Film 10 is heated such that second outer layer 11A reaches its crystalline softening point Tc prior to film 10 reaching the nipping station. Because of the presence of EBA or EAA, second outer layer 11A has a lower Tc than that of fourth inner layer 12A due to the higher softening point of HDPE. Thus, second outer layer 11A softens to a greater degree than fourth inner layer 12A. The various layers of film 10 become amorphous when heated, thus facilitating the formation of exchange bonds among the layers of film 10 and between second outer layer 11A and absorbent layer 20. These secondary and tertiary bonds remain highly stable, even after contact with water for an extended period of time, resulting in a concrete curing cover 40 that can withstand the long-term hot, wet environment experienced during concrete curing.

As discussed in greater detail below, various additives 50 (in addition to or instead of the coloring and antiskid components discussed above) can be added to concrete curing cover 40. The various additives can be added (1) during the lamination process as shown in FIG. 2, (2) to film 10 and/or the various components that make up the different layers of film 10, including addition in the form of a masterbatch, (3) to absorbent layer 20 and/or (4) to adhesive 30. After heating, film 10 is bonded to raised surfaces 21 of absorbent layer 20 so as to create pockets between recessed areas 22 and film 10. The nip opening and nip pressure are adjusted so as to achieve the desired bonding and bond strength. These pockets can pick up water during the hydration process and retain that water for use during the curing process. In certain embodiments of the invention, the pockets retain water for at least 7 days and up to 21 or more days.

In one embodiment of the present invention, the resulting concrete curing cover 40 has the following characteristics:
   Bond Strength—From 100 to 2000 grams per inch
   Bond Strength after 24 Hours Water Saturation—At Least 20 grams per inch
   Basis Weight—From 70 to 300 grams per square meter (film from 40 to 200 grams per square meter, absorbent layer from 30 to 120 grams per square meter, adhesive from 1 to 10 grams per square meter)
   Machine Directional Tear—From 500 to 8000 grams
   Cross Directional Tear—From 500 to 8000 grams
   Water Vapor Transmission Rate (ASTM F1249-13 or ASTM E96)—From 0.5 to 9.9 grams per square meter per day Concrete cures better when the pH of the water used to hydrate the curing concrete member is the same as or close to the pH of the curing reaction. Tap water typically has a pH of 6.5 to 8.5. Curing concrete generally ranges in pH from about 11 to about 13.5, with about 12.5 being considered typical. In various embodiments of the present invention, pH modifying additives are utilized in an amount effective to alter the pH of the water used to hydrate the curing concrete to the desired level, preferably close to that of the concrete curing reaction. For example, pH modifying additives such as sodium acetate, wollastonite, calcium oxide and/or calcium hydroxide can be added to one or more layers of concrete curing cover 40 and/or to water applied to the poured or precast concrete member. These pH modifying additives can be added directly to the layers of concrete curing cover 40 or as a pH modifying component in the form of a masterbatch including one or more pH modifying additives.

If added to concrete curing cover 40, these additives will raise the pH of water that comes into contact with the concrete curing cover. In one embodiment of the present invention, calcium oxide is used to raise the pH of the water used to hydrate the curing concrete. When the calcium oxide comes into contact with water, it produces calcium hydroxide and gives off heat as a side effect of the reaction. The additives can be incorporated into concrete curing cover 40 in any one of the manners discussed above or in any other manner that is effective to raise the pH of the water that comes into contact with concrete curing cover 40. Note that if calcium oxide is used as the additive, the pH modifying component preferably includes EBA and the matrix polymer of the layer of film 10 into which the component is incorporated is preferably EBA copolymer.

Absorbent layer 20 is highly absorbent and will retain water adjacent second outer layer 11A. The use of EBA in second outer layer 11A creates a layer that also readily absorbs water and has a relatively high water vapor transmission rate. Use of HDPE in fourth inner layer 12A creates a layer that essentially acts as a water barrier. Thus, hydration water applied to the concrete will migrate from absorbent layer 20 to second outer layer 11A and be retained there by the barrier effect of fourth inner layer 12A. This will allow the hydration water to contact pH modifying components incorporated into second outer layer 11A, thereby raising the pH of the hydration water.

Figure 3A:
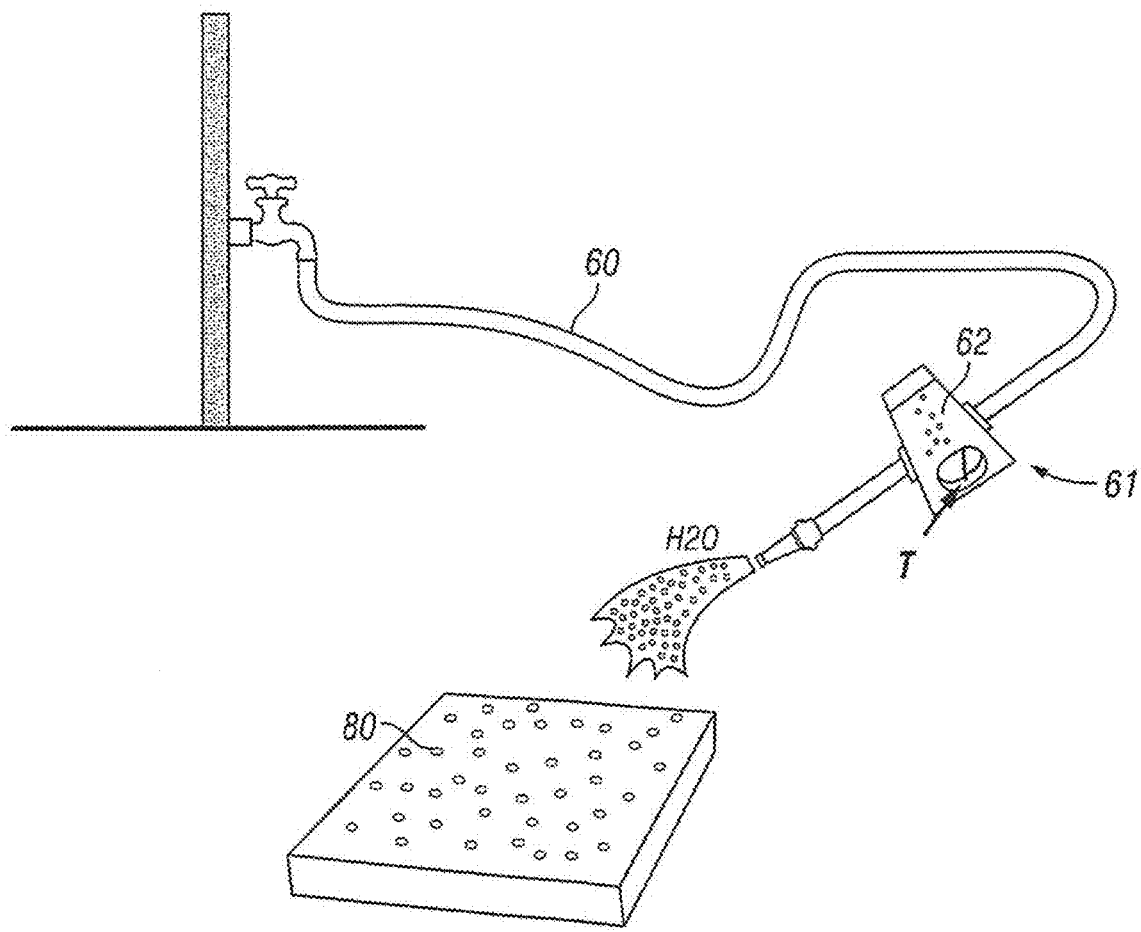
FIGS. 3A and 3B are perspective views of methods of curing a concrete member according to embodiments of the present invention.
Figure 3B:
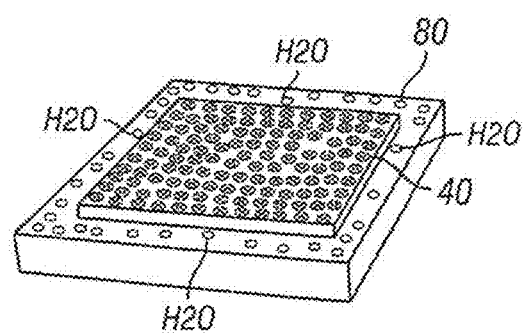
Figure 4A:
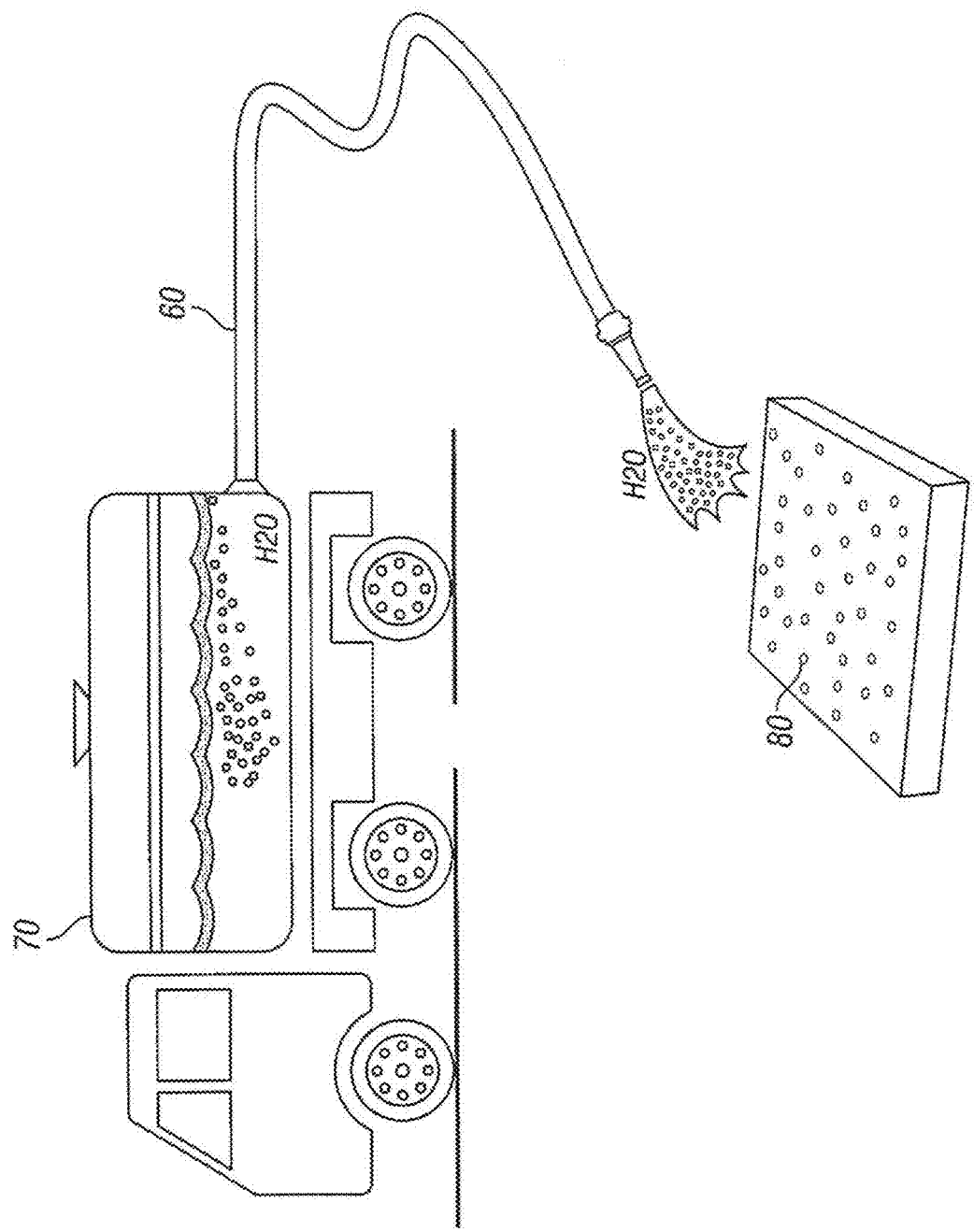
FIGS. 4A and 4B are perspective views of methods of curing a concrete member according to embodiments of the present invention.
Figure 4B:
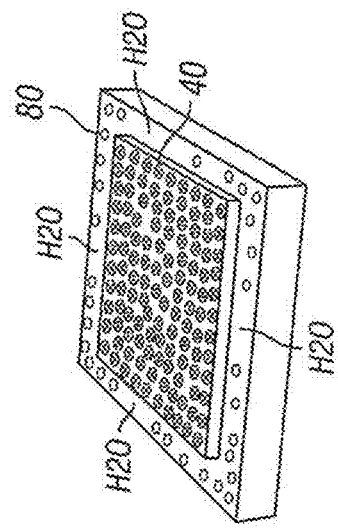

In addition to (or instead of) including pH modifying additives in concrete curing cover 40, the additives can also be added to the hydration water that is sprayed on the poured or precast concrete and/or concrete curing cover 40. FIGS. 3A and 3B illustrate one method of doing so. As shown in FIG. 3A, a spray device, such as a hose 60, can be provided with an attachment 61 having a chamber 62 through which the water flows. The pH modifying additives can be located in chamber 62. In the embodiment of FIGS. 4A and 4B, the pH modifying additives are added to the source of water, such as a tanker truck 70. The pH modifying additives can be added to attachment 61 or the water source, such as the tanker truck 70, in liquid form, by use of tablets T (such as effervescent tablets for better distribution of the pH modifying additive), water soluble pouches containing the elements or other means.

One method for curing concrete according to the present invention is to spray a concrete member 80 with water containing pH modifying additives, as shown in FIGS. 3A and 4A.

Another method is to cover member 80 that has been sprayed with water containing pH modifying additives with concrete curing cover 40, as shown in FIGS. 3B and 4B. Cover 40 may (or may not) include pH modifying additives and can be applied to member 80 (1) dry, (2) after being sprayed with tap water and/or (3) after being sprayed with water containing pH modifying additives.

Another method is to spray concrete curing cover 40 (either with or without pH modifying additives) with water (either with or without pH modifying elements) and place it on a concrete member 80 that has not previously been sprayed with water or which has been sprayed with water that does not contain pH modifying additives.

Figure 5:
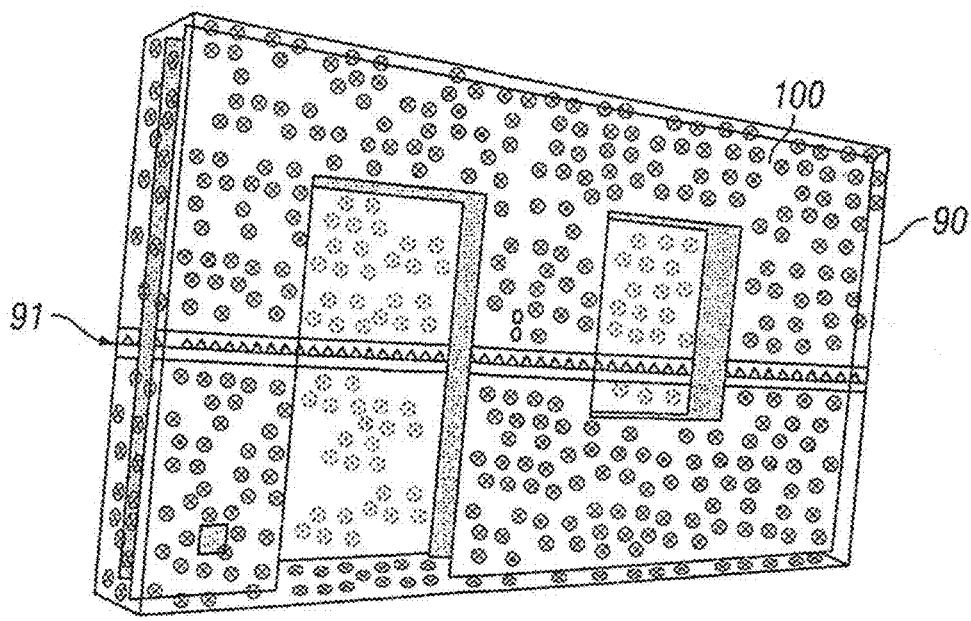
FIG. 5 is a perspective view of a concrete curing cover according to an embodiment of the present invention.

FIG. 5 shows another method according to embodiments of the present invention. In this embodiment, the concrete curing cover has been formed into a custom fit enclosure (such as a pouch) 90 that can be secured to precast concrete member 100. Enclosure 90 can be formed by means of heat welding, sewing or other methods known in the art. As with the methods discussed above, enclosure 90 may (or may not) include pH modifying additives. Enclosure 90 and/or member 100 can be sprayed (or not) and the water utilized may (or may not) include pH modifying additives as discussed above in connection with the embodiments of FIGS. 3A, 3B, 4A and 4B. Enclosure 90 can be provided with zippers, snaps or other fastening mechanisms 91 to secure them to member 100 to aid in retaining moisture on the interior of enclosure 90. Use of enclosure 90 allows the curing process to continue during storage and shipping of member 100. Enclosure 90 also acts as protective packaging for member 100.

Figure 6:
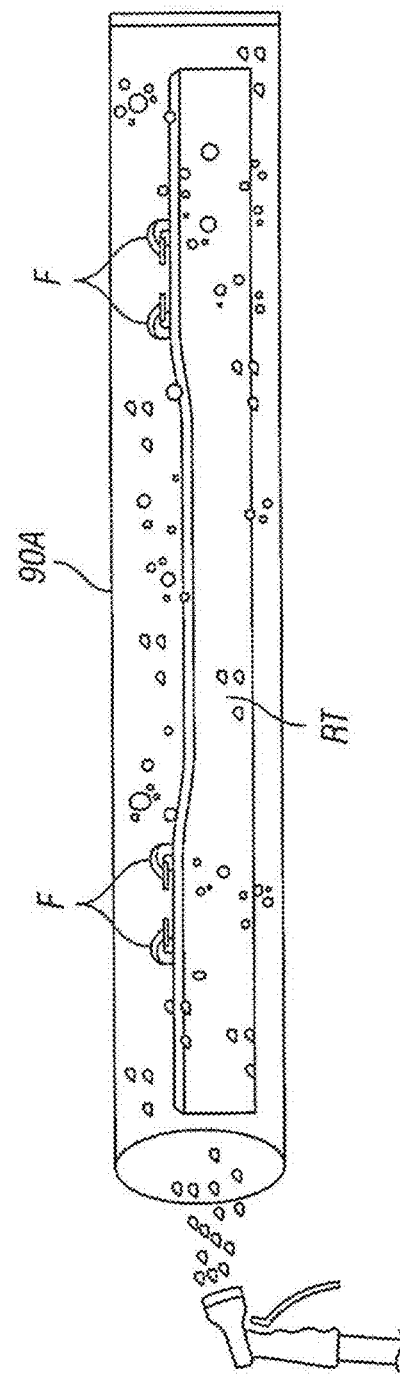
FIG. 6 illustrates methods of curing a concrete member according to embodiments of the present invention.

FIG. 6 illustrates methods of curing a concrete member according to embodiments of the present invention. In this embodiment, a concrete railroad tie RT is placed inside a custom fit enclosure 90A in the form of a pre-made tube formed from a concrete curing cover according to embodiments of the present invention. Enclosure 90A is sealed at one end. Water for hydrating curing railroad tie RT is sprayed into enclosure 90A and the open end is sealed. In the embodiment shown, railroad tie RT includes metal fittings F. If desired, protective covers, such as plastic caps having corrosion inhibitors, can be secured to fittings F to protect them during shipping and storage in enclosure 90A.

In another embodiment of the present invention, curing cover 80 or enclosure 90 can remain on the curing concrete member after installation. For example, cover 80 can be placed on a precast concrete pipe intended for underground installation and left on the pipe during transport and during and after installation, thereby facilitating continued curing, protecting the pipe and preventing surface damage that could be caused by rocks, dirt, sand, etc.

In certain embodiments of the present invention, hydration water is applied to the surface of the curing concrete after the concrete reaches the bleed stage. The curing cover is then placed on the curing concrete. The bleed water can be removed from the surface prior to applying hydration water to the surface and applying the curing cover.

To determine the effect of pH modifying additives, applicant added various additives in the form of a masterbatch to 50 ml of tap water having a pH of approximately 7.8. Applicant has found that combining 10-25 grams of a masterbatch containing 20% calcium oxide and 80% polyethylene raises the pH of 50 ml of water from about 7.75 to a pH of about 8.9-9.7. Combining 10-25 grams of a masterbatch containing 65% calcium oxide and 35% EBA raises the pH of 50 ml of water from about 7.75 to a pH of about 12.1-12.3. Combining 10-25 grams of a masterbatch containing 26% wollastonite and 74% polypropylene raises the pH of 50 ml of water from about 7.75 to about 8.3-8.6.

In another embodiment of the present invention, first outer layer 11 and second outer layer 11A of film 10 are constructed from about 50% to about 90% EBA, about 1% to about 25% of a pH modifying component containing about 65% of a pH modifying additive with the remainder EBA, about 5% to about 20% of a coloring component and about 1% to about 20% of an antiskid component. In one embodiment of the invention, first outer layer 11 and second outer layer 11A are constructed from 80% EBA, 10% a pH modifying component containing 65% of a pH modifying additive and 35% EBA, 5% a coloring component and 5% of an antiskid component.

In this embodiment, first inner layer 12 and fourth inner layer 12A are constructed from about 50% to about 90% HDPE, about 1% to about 25% LLDPE and about 5% to about 20% of a coloring component. In one embodiment of the invention, first inner layer 12 and fourth inner layer 12A are constructed from 70% HDPE, 15% LLDPE and 15% of a coloring component.

In this embodiment, second inner layer 13 and third inner layer 13A are constructed from an ethylene polypropylene copolymer.

In another embodiment of the invention, first outer layer 11 and second outer layer 11A are constructed from 67.5% EBA, 22.5% of a pH modifying component containing 65% of a pH modifying additive and 35% EBA, 5% of a coloring component and 5% of an antiskid component. In this embodiment, first inner layer 12 and fourth inner layer 12A are constructed from 70% HDPE, 15% LLDPE and 15% of a coloring component. Second inner layer 13 and third inner layer 13A are constructed from 60% LLDPE and 40% of an ethylene polypropylene copolymer.

Figure 7:
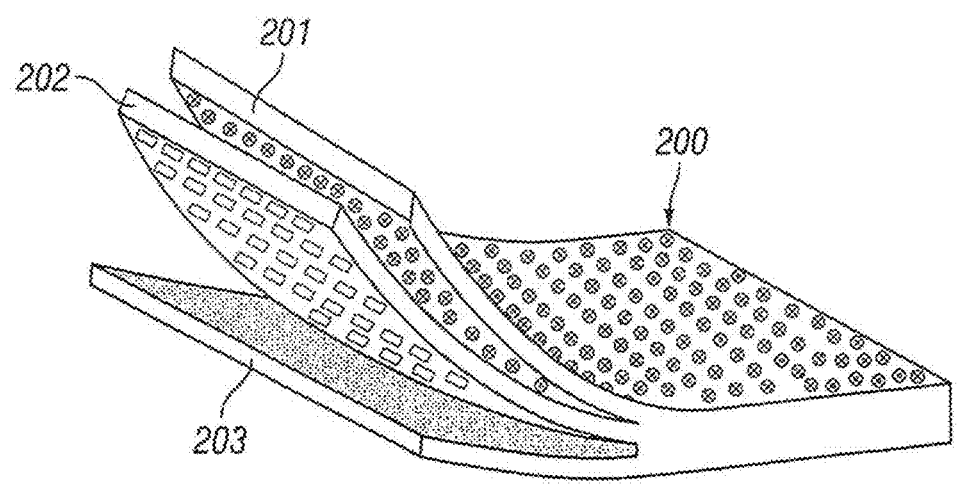
FIG. 7 is a partially exploded perspective view of a film that is a component of a concrete curing cover according to embodiments of the present invention.

FIG. 7 is an exploded perspective view of a film 200 that is a component of concrete curing covers according to other embodiments of the present invention. In the embodiment shown, film 200 has a first layer 201, a second layer 202 and a third layer 203. Film 200 is not produced by a collapsed bubble process but is instead a coextruded film. Third layer 203 is heated to its crystallization temperature Tc during lamination to absorbent member 20 (as described in connection with the above embodiments) during the lamination process.

In one embodiment of the present invention, first layer 201 is constructed from about 50% to about 85% HDPE, about 5% to about 20% LLDPE, about 1% to about 20% of an antiskid component and about 5% to about 20% of a coloring component. In one embodiment, first layer 201 is constructed from 65% HDPE, 20% LLDPE, 5% of an antiskid component and 10% of a coloring component.

In one embodiment of the present invention, second layer 202 is constructed from about 20% to about 45% HDPE, about 50% to about 85% LLDPE and about 5% to about 20% of a coloring component. In one embodiment, second layer 202 is constructed from 30% HDPE, 60% LLDPE and 10% of a coloring component.

In one embodiment of the present invention, third layer 203 is constructed from about 10% to about 80% HDPE, about 5% to about 85% LLDPE, about 5% to about 50% of a pH modifying component including about 65% of a pH modifying additive and 35% EBA and about 0% to about 20% of a coloring component. In one embodiment, third layer 203 is constructed from 70% HDPE, 20% LLDPE, 5% of a pH modifying component containing 65% of a pH modifying additive and 35% EBA and 5% of a coloring component.

Figure 8:
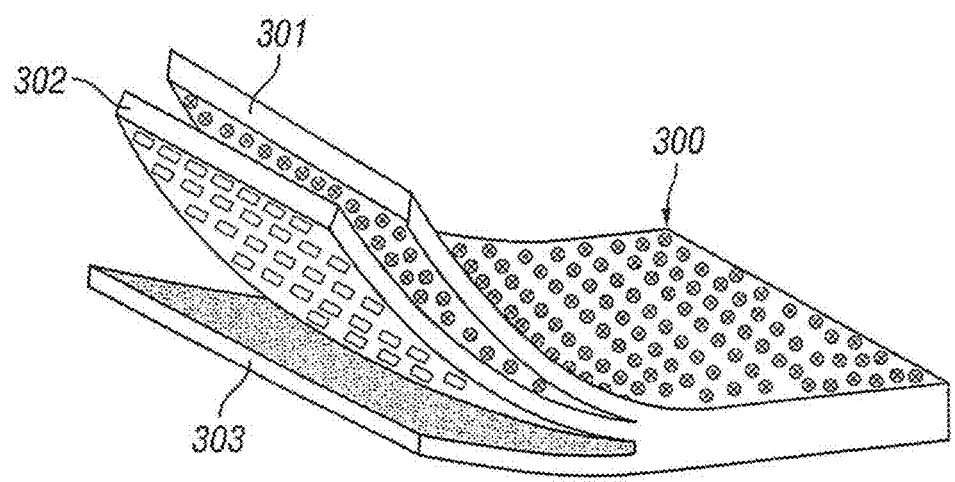
FIG. 8 is a partially exploded perspective view of a film that is a component of a concrete curing cover according to embodiments of the present invention.

FIG. 8 is an exploded perspective view of a film 300 that is a component of concrete curing covers according to other embodiments of the present invention. In the embodiment shown, film 300 has a first layer 301, a second layer 302 and a third layer 303. This embodiment is also a coextruded film. During lamination, third layer 303 is heated to its crystallization temperature Tc to facilitate formation of exchange bonds as discussed above. Because of the presence of EBA, third layer 303 has a Tc lower than that of first layer 301 and second layer 302.

In one embodiment of the present invention, first layer 301 is constructed from about 50% to about 90% EAA, about 0% to about 20% HDPE, about 1% to about 20% of an antiskid component and about 5% to about 20% of a coloring component. In one embodiment, first layer 301 is constructed from 65% EAA, 20% HDPE, 5% of an antiskid component and 10% of a coloring component.

In one embodiment of the present invention, second layer 302 is constructed from about 10% to about 60% HDPE, about 5% to about 20% LDPE, about 5% to about 20% of a coloring component and about 10% to about 60% LLDPE. In one embodiment, second layer 302 is constructed from 60% HDPE, 10% LDPE and 10% of a coloring component and 20% LLDPE.

In one embodiment of the present invention, third layer 303 is constructed from about 40% to about 99% EBA and about 1% to about 60% of a pH modifying component including about 65% of a pH modifying additive and the remainder EBA. In one embodiment, third layer 303 is constructed from 50% EBA and 50% of a pH modifying component having 65% of a pH modifying additive and 35% EBA.

Figure 9:
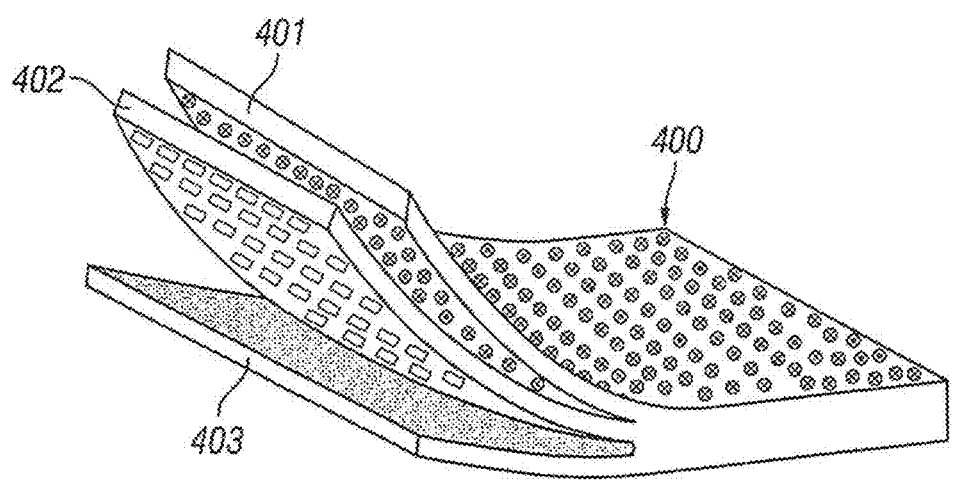
FIG. 9 is a partially exploded perspective view of a film that is a component of a concrete curing cover according to embodiments of the present invention.

FIG. 9 is an exploded perspective view of a film 400 that is a component of concrete curing covers according to other embodiments of the present invention. In the embodiment shown, film 400 has a first layer 401, a second layer 402 and a third layer 403.

In one embodiment of the present invention, first layer 401 is constructed from about 5% to about 44% EBA, about 50% to about 85% LLDPE, about 1% to about 20% of an antiskid component and about 5% to about 20% of a coloring component. In one embodiment, first layer 401 is constructed from 20% EBA, 65% LLDPE, 5% of an antiskid component and 10% of a coloring component.

In one embodiment of the present invention, second layer 402 is constructed from about 10% to about 60% HDPE, about 5% to about 20% LDPE, about 5% to about 20% of a coloring component and about 10% to about 60% LLDPE. In one embodiment, second layer 402 is constructed from 60% HDPE, 10% LDPE and 10% of a coloring component and 20% LLDPE.

In one embodiment of the present invention, third layer 403 is constructed from about 40% to about 99% EBA and about 1% to about 60% of a pH modifying component including about 65% of a pH modifying additive and the remainder EBA. In one embodiment, third layer 403 is constructed from 70% EBA and 30% of a pH modifying component having 65% of a pH modifying additive and 35% EBA.

In certain embodiments of the invention, the EBA component of the film layers is supplied in the form of Lucofin 1400 MN, Lucofin 1400 PN or Lucofin 1400 HN and the EBA in the pH modifying component is supplied in the form of EBA 990341, all of which are available from Chemigon, LLC of Akron, Ohio.

EBA has a relatively high water vapor transmission rate compared to those of LLDPE, HDPE and LDPE. In the embodiments discussed above that utilize EBA, water is able to penetrate the EBA containing layers and react with the pH modifying additive, such as calcium oxide. However, water will not as readily penetrate the layers that do not contain EBA. Thus, concrete curing covers of the present invention will retain pH modified water in or near the inner layers of the film and absorbent layer 20, thereby maintaining the pH modified water in contact with the curing concrete member. For example, the water vapor transmission rate of Lucofin 1400 HN is approximately 27.6 grams*mil per meter squared per day. However, in embodiments of the present invention, the overall water vapor transmission rate of concrete curing cover 40 is 4.2 to 4.6 grams per meter squared per day. This is due to the low water vapor transmission rate of the middle layer or layers.

In another embodiment of the present invention, first outer layer 11 and second outer layer 11A of film 10 are constructed from about 0% to about 90% LLDPE, about 0% to about 90% LDPE, about 1% to about 20% of a pH modifying component containing about 65% of a pH modifying additive with the remainder EBA, about 1% to about 20% of a coloring component and about 1% to about 10% of an antiskid component. In one embodiment of the invention, first outer layer 11 and second outer layer 11A are constructed from 76% LLDPE, 10% LDPE, 1% a pH modifying component, 10% a coloring component and 3% of an antiskid component.

In this embodiment, first inner layer 12 and fourth inner layer 12A are constructed from about 20% to about 90% HDPE, about 0% to about 90% LLDPE and about 1% to about 20% of a coloring component. In one embodiment of the invention, first inner layer 12 and fourth inner layer 12A are constructed from 73% HDPE, 20% LLDPE and 7% of a coloring component.

In this embodiment, second inner layer 13 and third inner layer 13A are constructed from about 20% to about 100% elastomer polymer and about 0% to about 80% LLDPE. In one embodiment of the present invention, second inner layer 13 and third inner layer 13A are constructed from 40% elastomer polymer and 60% LLDPE.

In another embodiment of the present invention, first outer layer 11 and second outer layer 11A of film 10 are constructed from about 0% to about 90% LLDPE, about 0% to about 90% LDPE, about 1% to about 20% of a pH modifying component containing about 65% of a pH modifying additive with the remainder EBA, about 1% to about 20% of a coloring component and about 1% to about 20% of an antiskid component. In one embodiment of the invention, first outer layer 11 and second outer layer 11A are constructed from 65% LLDPE, 10% LDPE, 1% of a pH modifying component, 9% of a coloring component and 15% of an antiskid component.

In this embodiment, first inner layer 12 and fourth inner layer 12A are constructed from about 20% to about 90% HDPE, about 0% to about 90% LLDPE and about 1% to about 20% of a coloring component. In one embodiment of the invention, first inner layer 12 and fourth inner layer 12A are constructed from 72% HDPE, 20% LLDPE and 8% of a coloring component.

In this embodiment, second inner layer 13 and third inner layer 13A are constructed from about 20% to about 100% ethylene polypropylene copolymer and about 0% to about 80% LLDPE. In one embodiment of the present invention, second inner layer 13 and third inner layer 13A are constructed from 40% ethylene polypropylene copolymer and 60% LLDPE.

In another embodiment of the present invention, first outer layer 11 and second outer layer 11A of film 10 are constructed from about 50% to about 80% LLDPE, about 0% to about 20% LDPE, about 1% to about 5% of a pH modifying component containing about 65% of a pH modifying additive with the remainder EBA, about 5% to about 20% of a coloring component and about 1% to about 5% of an antiskid component. In one embodiment of the invention, first outer layer 11 and second outer layer 11A are constructed from 76% LLDPE, 10% LDPE, 1% of a pH modifying component, 10% of a coloring component and 3% of an antiskid component.

In this embodiment, first inner layer 12 and fourth inner layer 12A are constructed from about 50% to about 90% HDPE, about 0% to about 20% LLDPE, about 0% to about 10% of an ethylene polypropylene copolymer and about 5% to about 20% of a coloring component. In one embodiment of the invention, first inner layer 12 and fourth inner layer 12A are constructed from 73% HDPE, 20% LLDPE and 7% of a coloring component.

In this embodiment, second inner layer 13 and third inner layer 13A are constructed from about 20% to about 100% of an ethylene polypropylene copolymer and about 0% to about 80% LLDPE. In one embodiment of the present invention, second inner layer 13 and third inner layer 13A are constructed from 40% ethylene polypropylene copolymer and 60% LLDPE.

In another embodiment of the present invention, first layer 201 is constructed from about 0% to about 90% HDPE, about 0% to about 90% LLDPE, about 1% to about 10% of an antiskid component and about 1% to about 20% of a coloring component. In one embodiment, first layer 201 is constructed from 27% HDPE, 60% LLDPE, 3% of an antiskid component and 10% of a coloring component.

In one embodiment of the present invention, second layer 202 is constructed from about 20% to about 90% HDPE, about 0% to about 90% LLDPE and about 1% to about 20% of a coloring component. In one embodiment, second layer 202 is constructed from 70% HDPE, 20% LLDPE and 10% of a coloring component.

In one embodiment of the present invention, third layer 203 is constructed from about 0% to about 90% HDPE, about 0% to about 90% LLDPE, about 1% to about 20% of a pH modifying component including about 65% of a pH modifying additive and 35% EBA and about 0% to about 20% of a coloring component. In one embodiment, third layer 203 is constructed from 33% HDPE, 66% LLDPE and 1% of a pH modifying component.

In another embodiment of the present invention, first layer 201 is constructed from about 0% to about 90% HDPE, about 0% to about 90% LLDPE, about 1% to about 10% of an antiskid component and about 1% to about 20% of a coloring component. In one embodiment, first layer 201 is constructed from 25% HDPE, 60% LLDPE, 5% of an antiskid component and 10% of a coloring component.

In one embodiment of the present invention, second layer 202 is constructed from about 20% to about 90% HDPE, about 0% to about 90% LLDPE and about 1% to about 20% of a coloring component. In one embodiment, second layer 202 is constructed from 70% HDPE, 20% LLDPE and 10% of a coloring component.

In one embodiment of the present invention, third layer 203 is constructed from about 0% to about 90% HDPE, about 5% to about 50% EBA, about 5% to about 50% of a pH modifying component including about 65% of a pH modifying additive and 35% EBA and about 0% to about 20% of a coloring component. In one embodiment, third layer 203 is constructed from 50% EBA and 50% of a pH modifying component.

Water vapor transmission rate testing was performed on three specimens of two concrete curing covers constructed according to different embodiments of the present invention. One cover utilized a film constructed according to Embodiment #5 of FIG. 10. The other cover utilized a film constructed according to Embodiment #1 of FIG. 10 in which EBA was replaced with EAA. The tests were conducted in accordance with ASTM C171-16 *Standard Specification for Sheet Materials for Curing Concrete*, ASTM International, 2016 following the "water method" procedure as described by ASTM E96/E96M-16 *Standard Test Methods for Water Vapor Transmission of Materials*, ASTM International, 2016. The test specimens were kept in an environmental chamber specified by ASTM C156. The duration of the test was approximately one week. The mass of the test assembly was recorded at least twice a day for the duration of the testing.

Figure 11:
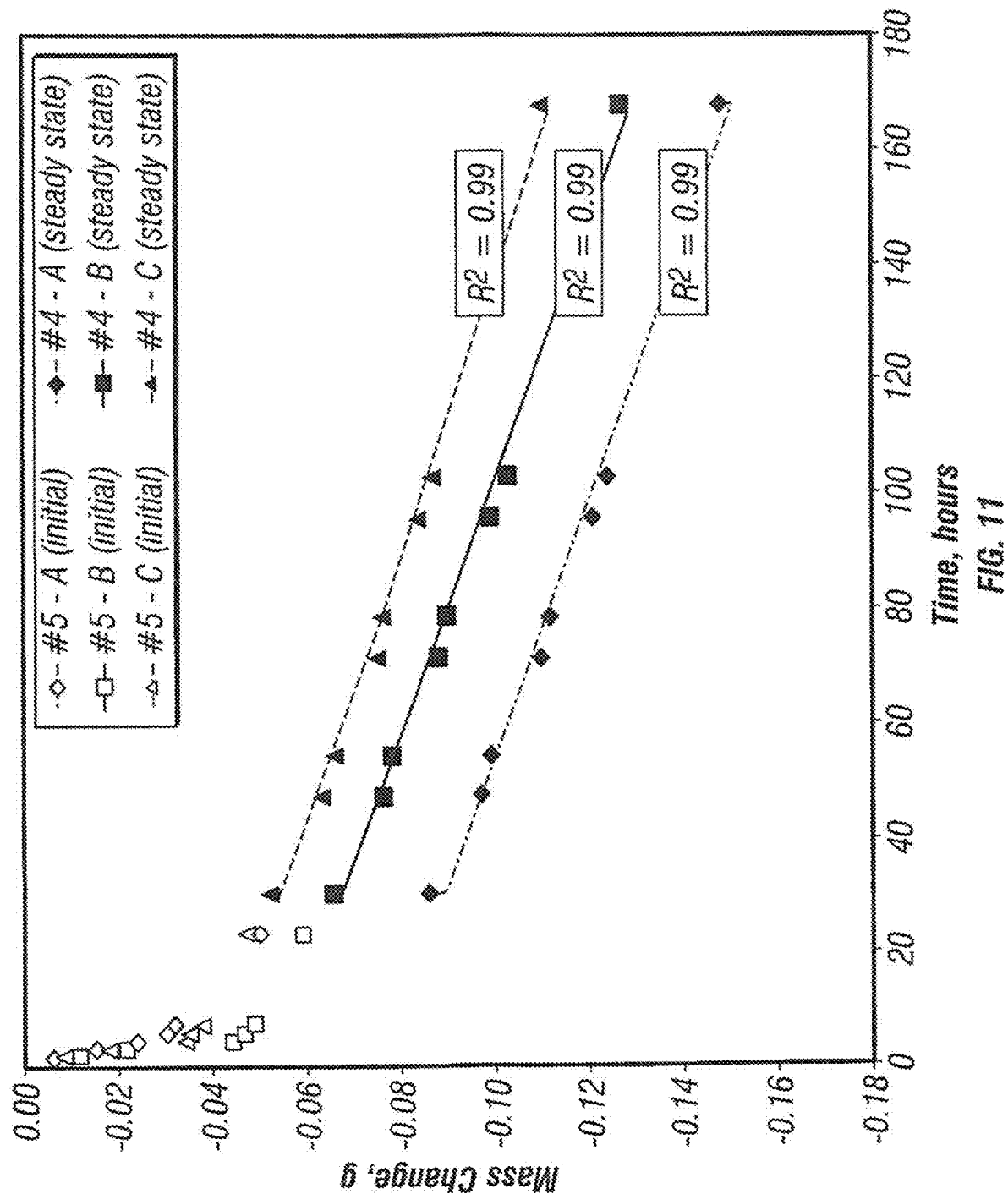
FIG. 11 shows the results of water vapor transmission rate testing performed on samples of a concrete curing cover according to one embodiment of the present invention.
Figure 12:
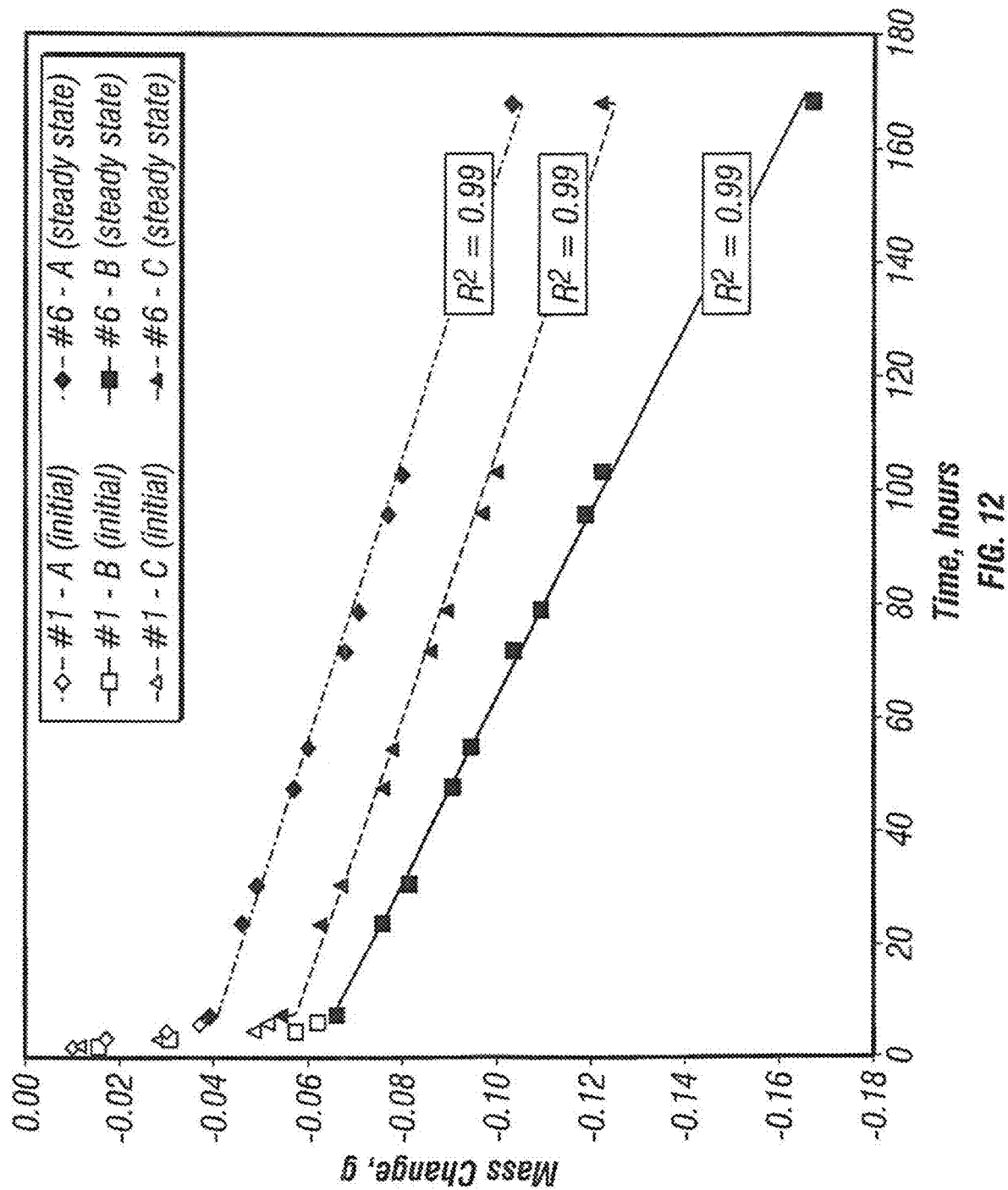
FIG. 12 shows the results of water vapor transmission rate testing performed on samples of a concrete curing cover according to another embodiment of the present invention.

The performance of both embodiments was relatively similar, with measured water vapor transmission rates of 4.6 g/m$^2$/24 h for the Embodiment #1 cover and 4.2 g/m$^2$/24 h for the Embodiment #5 cover. As shown in FIGS. 11 and 12, bi-linear curves were observed for the mass loss/time relationship. During the first 24 to 36 hours, a higher water vapor transmission rate was observed for the tested samples, before reaching the second leg of the bi-linear curve. The first portion of the curve captures a transient state of the test with a rapid mass change, which is expected according to the ASTM E96 test method.

In order to investigate the performance of concrete curing covers according to embodiments of the present invention compared to other curing products and methods, 7 identical 12×12×3 in. concrete slabs were fabricated and subjected to different curing methods. One slab was not covered, two slabs were cured using a polyethylene sheet over initially-wetted burlap ("PE/B"), two slabs were cured using a cover including a film constructed according to Embodiment #5 of FIG. 10 and two slabs were cured using a cover including a film constructed according to Embodiment #1 of FIG. 10 in which EBA was replaced with EAA. Individual curing times varied for each slab from the cured pair of slabs (i.e., those cured using PE/B, the Embodiment #5 cover and the Embodiment 1 cover). One slab of each pair was cured for 3 days and the other was cured for 7 days. Only the top surface of each slab was subjected to the utilized curing measure. The curing covers were removed after the specified times and for remainder of the testing, only the top surface of each slab was subjected to drying. The sides and the bottom of the slabs remained sealed in their molds to prevent moisture loss from these surfaces.

The concrete mixture utilized for fabrication of test specimens was a representative high-performance concrete (HPC) bridge deck mixture. These mixtures typically contain a combination of cementitious materials (i.e., portland cement, fly ash, silica fume, etc.) and are designed with to limit the overall water content, typically expressed as water-to-cementitious ratio (w/cm). The concrete mixture used contained 440 lbs/yd$^3$ of cement formulated according to ASTM C150/C150M-17, *Standard Specification for Portland Cement*, ASTM International, West Conshohocken, Pa., 2017ASTM C150 Type I cement, 147 lbs/yd$^3$ of ASTM C618 Class C fly ash, 1662 lbs/yd$^3$ and 1512 lbs/yd$^3$ of coarse and fine aggregate, respectively, and 200 lbs/yd$^3$ of water. The w/cm was 0.34. Four chemical admixtures (air-entrainer, hydration stabilizer, and high- and mid-range reducers) were used to achieve desirable fresh concrete properties and proper workability that allowed for successful fabrication of the test slabs.

After the test slabs were fabricated, curing covers were applied, sealed and the slabs were transported to a controlled environment kept at 73° F.±3° F. and 50±4% relative humidity (RH). Rapid RH sensors were utilized to monitor relative humidity and temperature of the test slabs. For each slab, an RH sensor was placed in the center of the slab (1.5 inches below the top surface), and upon removing the curing cover, a second sensor was mounted to the surface of the slab. For the first 30 days, temperature and RH values were recorded on a daily basis, followed by weekly data collection for an additional 60 days.

Figure 13:
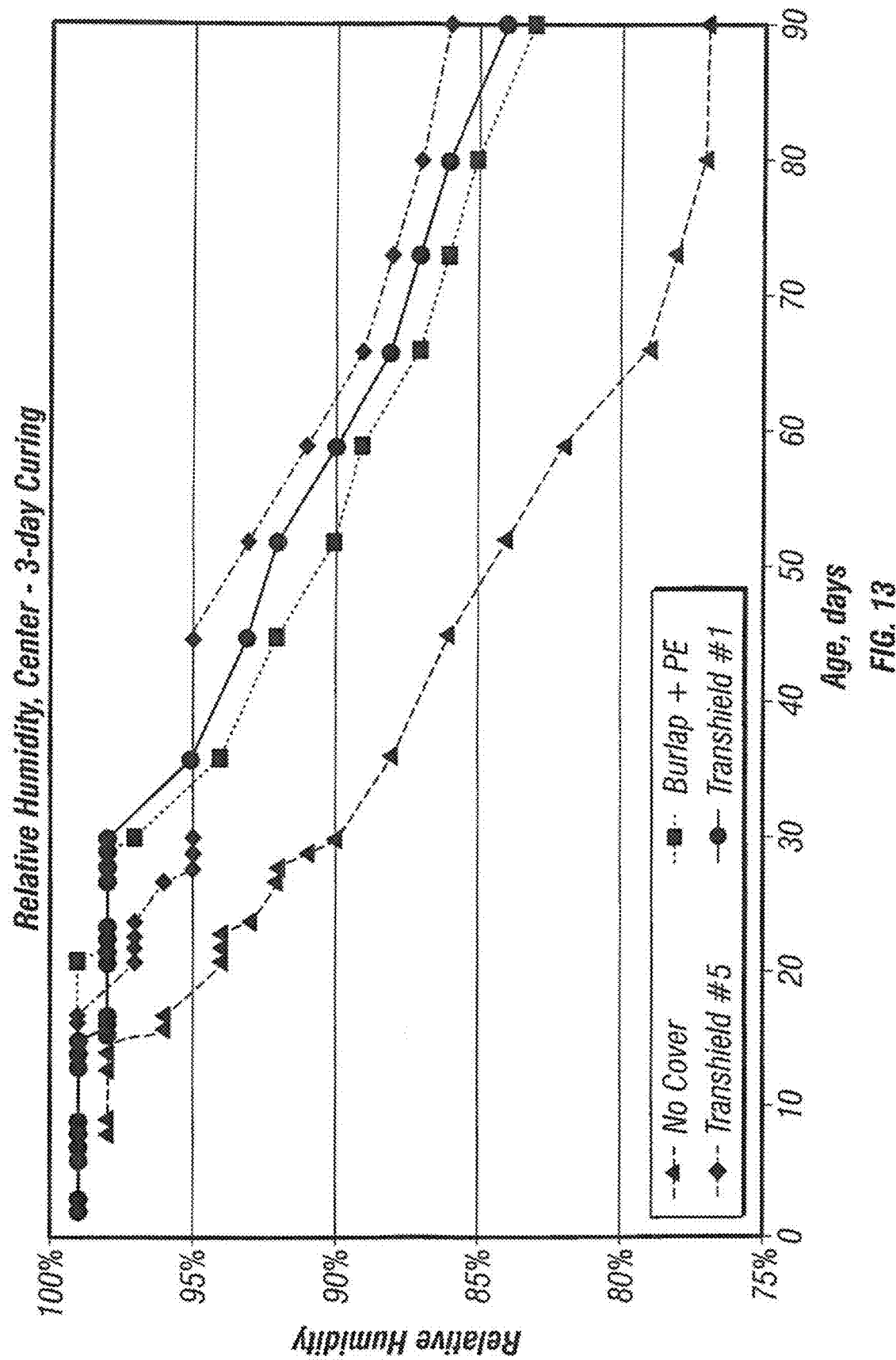
FIGS. 13 and 14 show the results of relative humidity testing performed on samples of concrete slabs cured for 3 days using concreted curing covers according to embodiments of the present invention as compared to other curing techniques.
Figure 14:
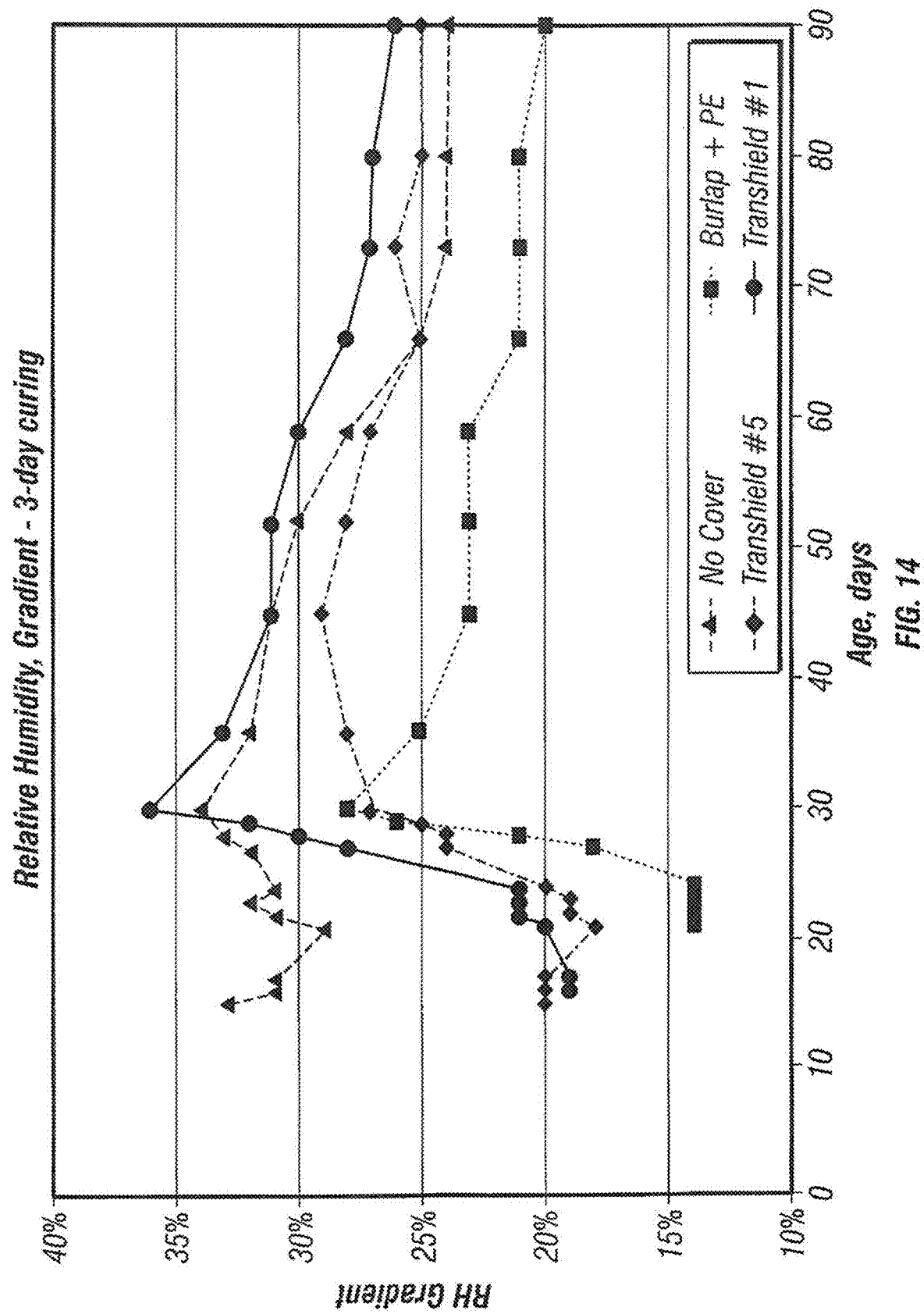
Figure 15:
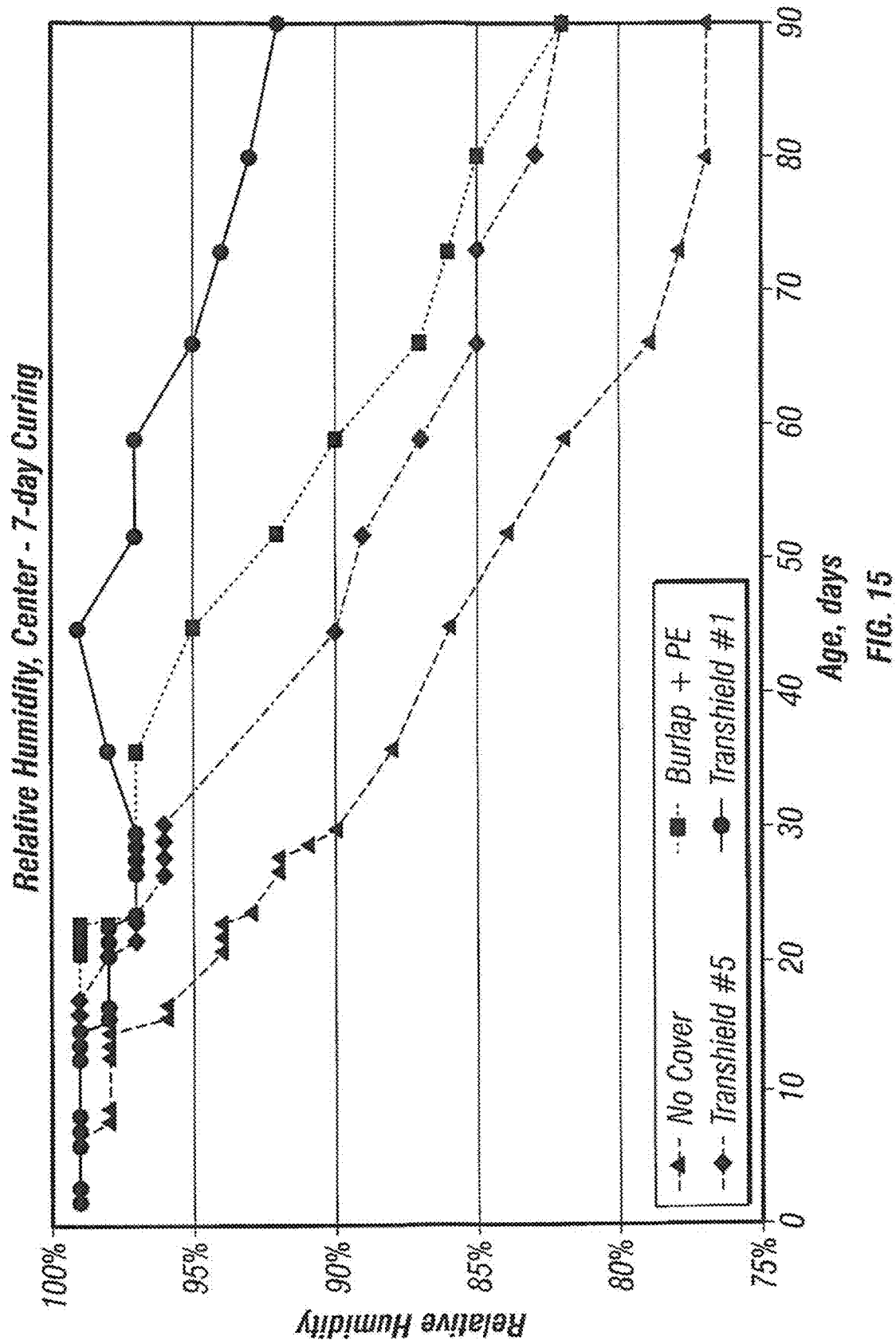
FIGS. 15 and 16 show the results of relative humidity testing performed on samples of concrete slabs cured for 7 days using concreted curing covers according to embodiments of the present invention as compared to other curing techniques.
Figure 16:
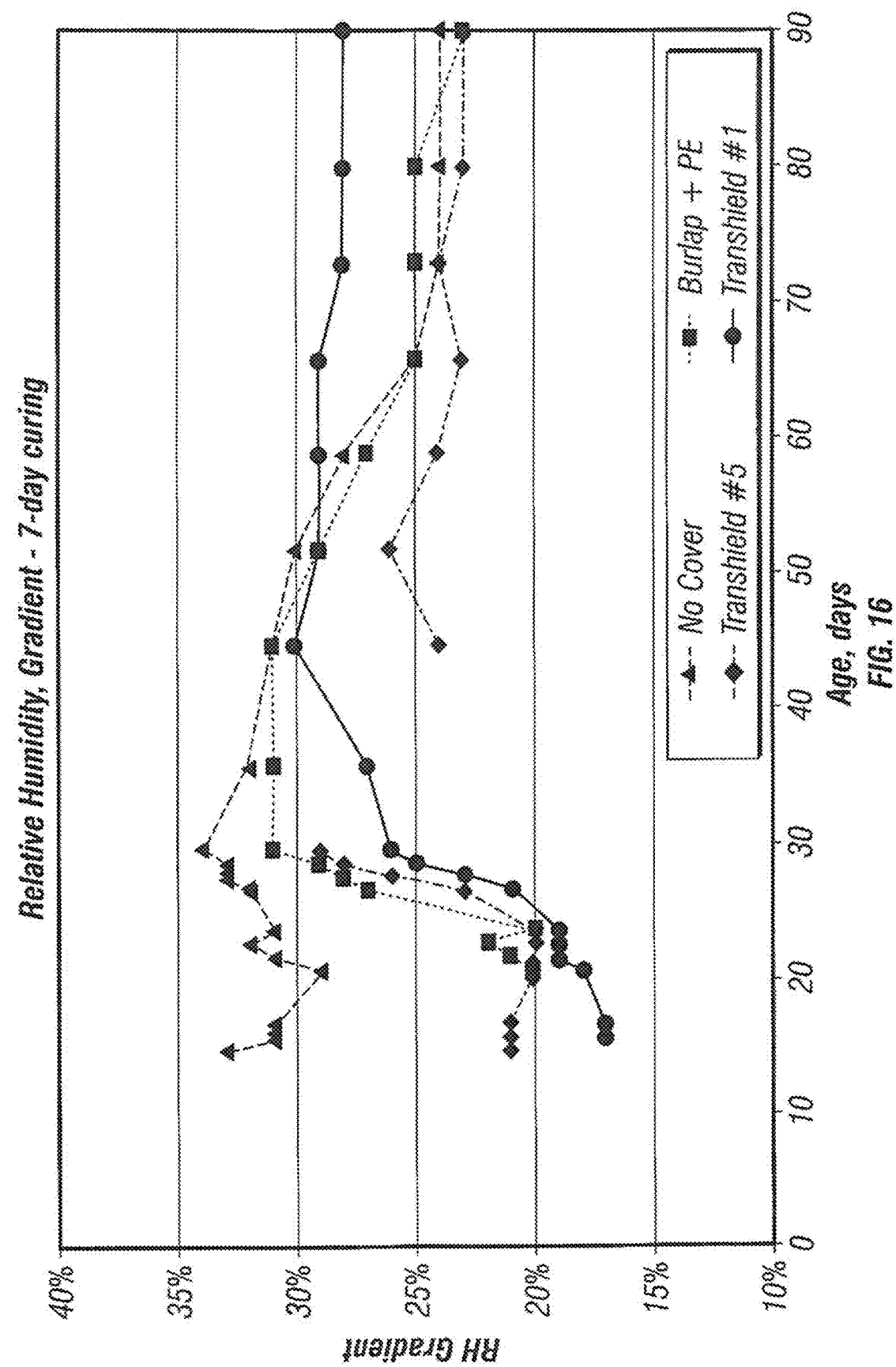

The results of the relative humidity testing are shown in FIGS. 13-16. The slab that was not covered dried the fastest, having internal relative humidity of 77% after 90 days in the drying room. The effect of curing duration did not have any significant effect on drying of slabs cured with the Embodiment #5 or Embodiment #1 covers or the polyethylene/burlap (PE/B) cover. For the slabs that were cured for 3 days, internal relative humidity of 86%, 83% and 84% was measured for the Embodiment #1, Embodiment #5 and PE/B slabs, respectively (FIGS. 13 and 14). Similarly, for the slabs that were cured for 7 days, internal relative humidity of 82% was measured for both the Embodiment #1 and PE/B slabs, while 92% internal relative humidity measured for the Embodiment #5 slab after 90-days of drying (FIGS. 15 and 16).

A petrographic examination was performed on a section of a slab that was cured with a concrete curing cover having a film constructed according to Embodiment #1 of FIG. 10 for 7 days and a section of the slab that was not covered. Petrographic examination of the sections was performed in accordance with ASTM C856-17, Standard Practice for Petrographic Examination of Hardened Concrete, ASTM International, West Conshohocken, Pa., 2017. The lapped surfaces of the slabs were examined using a stereomicroscope at magnifications up to 45×. The color, absorbency, hardness, luster and depth of carbonation of the cementitious paste were examined. Color was evaluated with the naked eye under ambient lighting, and under more intense lighting with the stereomicroscope. The overall hue of the paste is influenced most significantly by the cementitious materials used in the paste and by paste carbonation. The lightness or darkness of the paste color can be influenced by water-cementitious materials ratio (w/cm), porosity, degree of cement hydration and other factors. In general, paste that has been adequately cured will exhibit a greater degree of cement hydration and will be less absorbent, harder, and more lustrous than paste that has experienced inhibited cement hydration.

Figure 17:
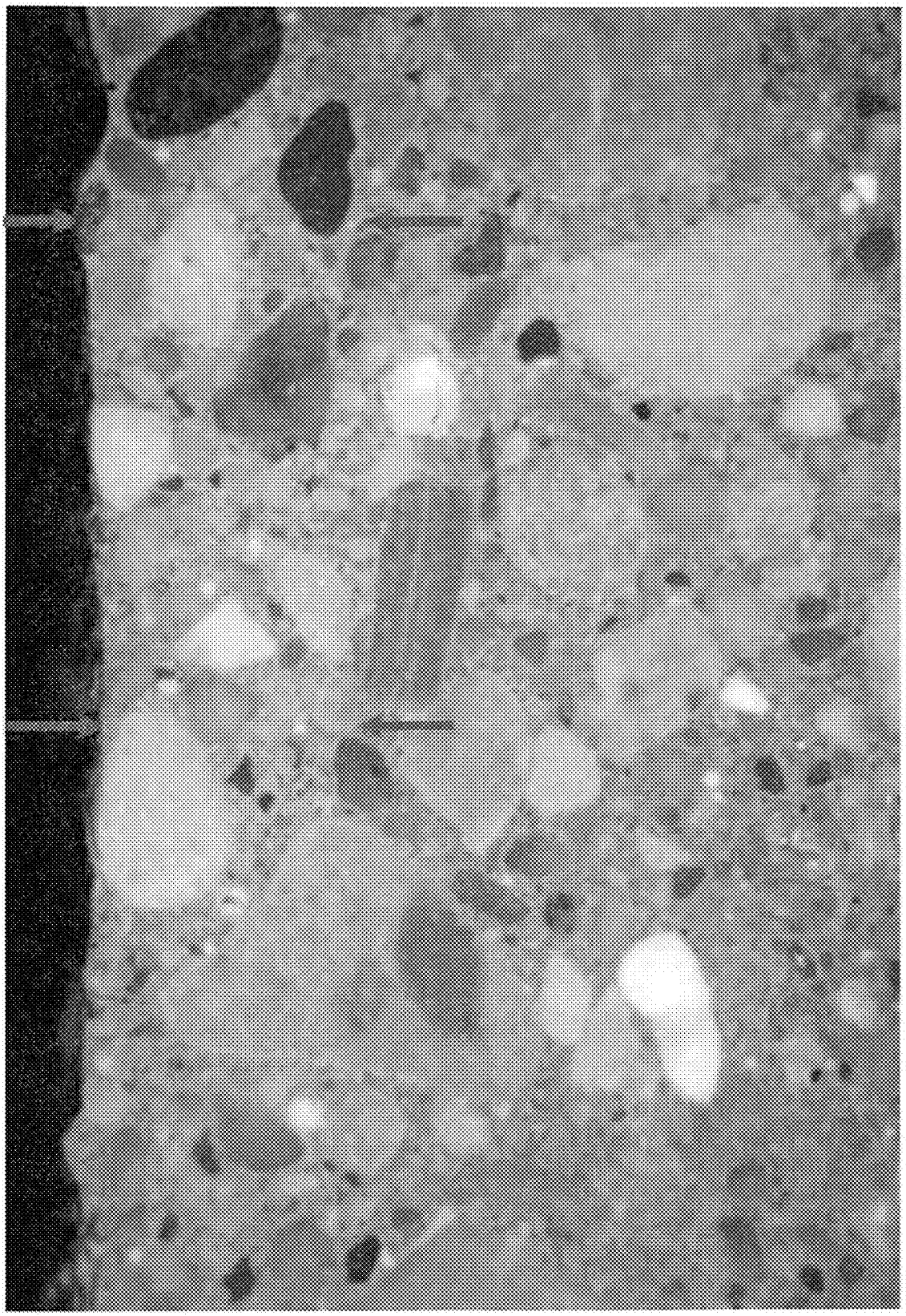
FIG. 17 illustrates a cross-section of a concrete slab that was cured without a cover.
Figure 18:
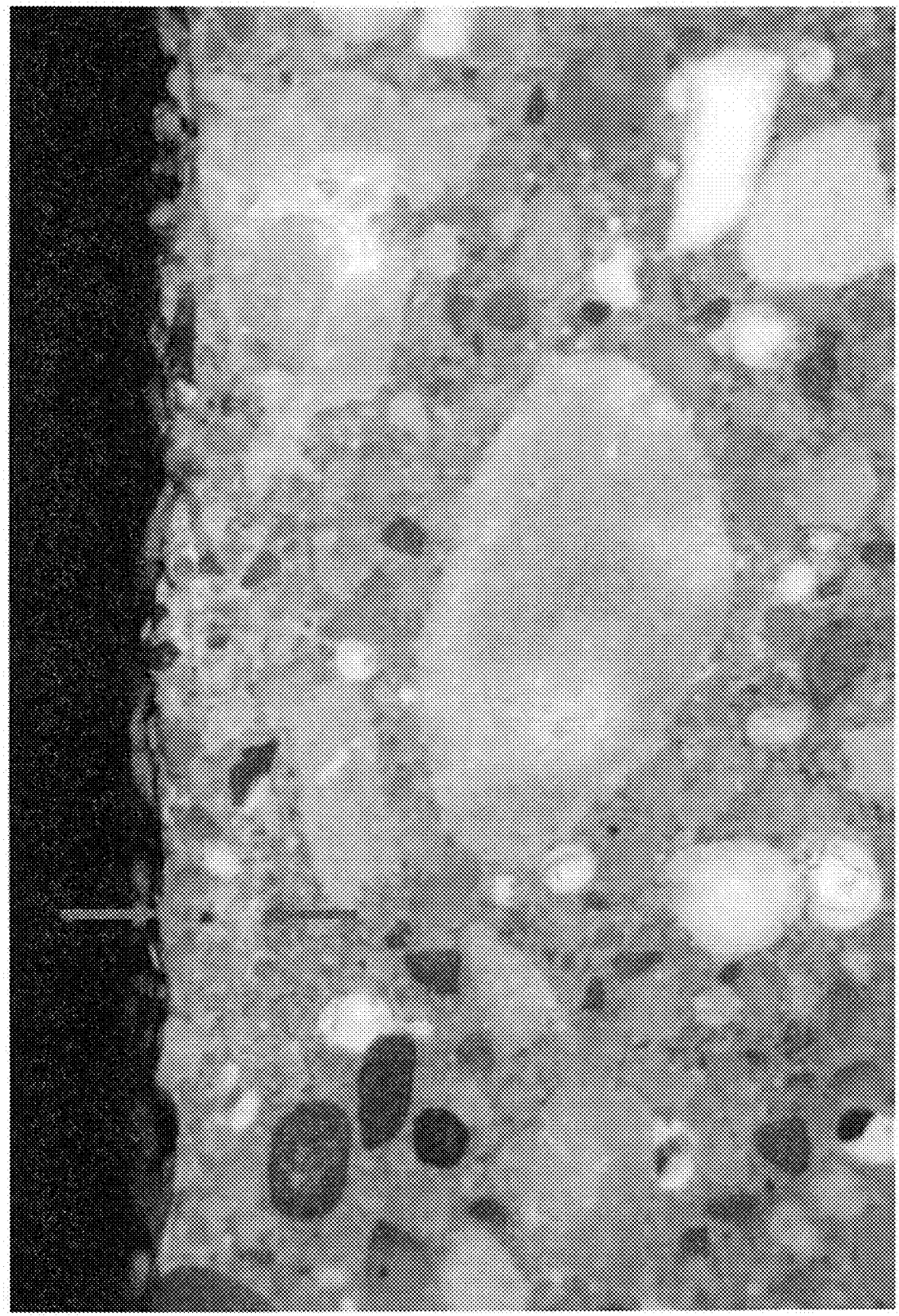
FIG. 18 illustrates a cross-section of a concrete slab that was cured utilizing a concrete curing cover according to one embodiment of the present invention.
Figure 19:
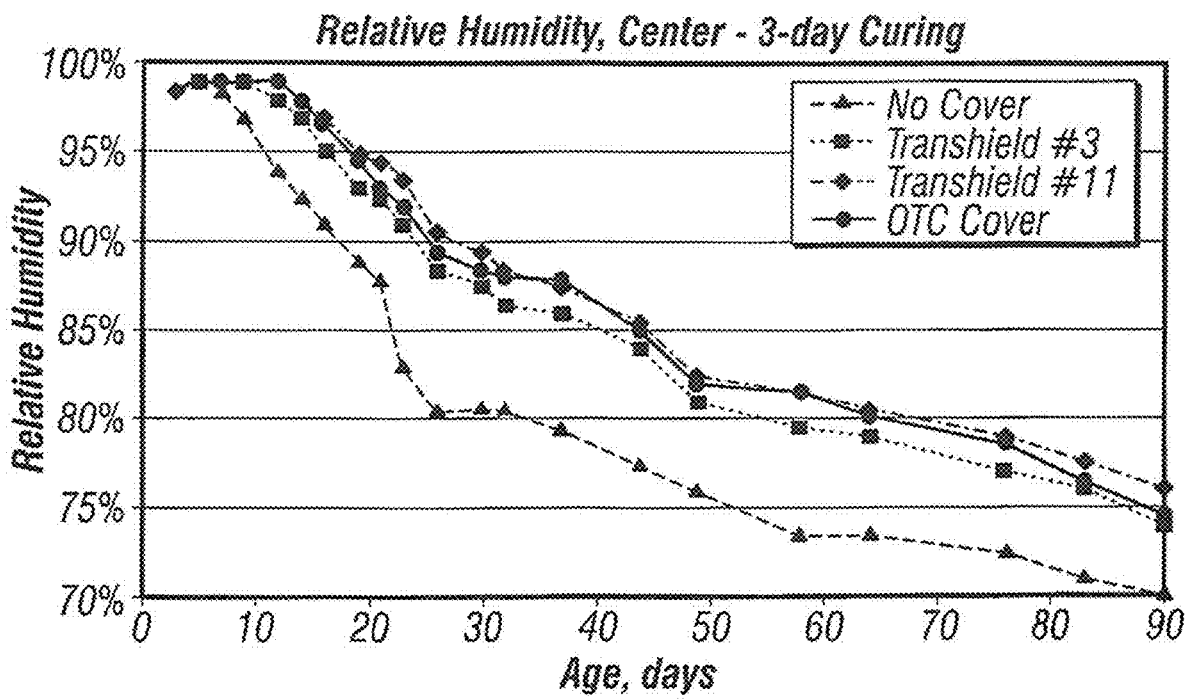
FIGS. 19 and 20 show the results of relative humidity testing performed on samples of concrete slabs cured for 3 days using concreted curing covers according to embodiments of the present invention as compared to other curing techniques.

For the near-surface portion of the slabs, a deeper zone of lower quality cementitious paste was observed for the slab that was not covered (indicated by arrows in FIG. 17) than for the slab that was covered with the Embodiment #1 cover (indicated by arrows in FIG. 18). In general, this zone exhibited medium beige-gray color, was moderately absorbent to absorbent, moderately hard and dull to subvitreous. For the slab that was not covered, this zone extended 6-10 mm below the surface, whereas the thickness of a zone with similar properties for the slab covered with the Embodiment #1 cover was only 1-5 mm, although in both instances the depth could vary by location in the sample. Similarly, the depth of carbonation was 2 to 4 mm for the slab that was not covered only 1-2 mm (locally up to 3 mm) for the slab covered with the Embodiment #1 cover.

Figure 20:
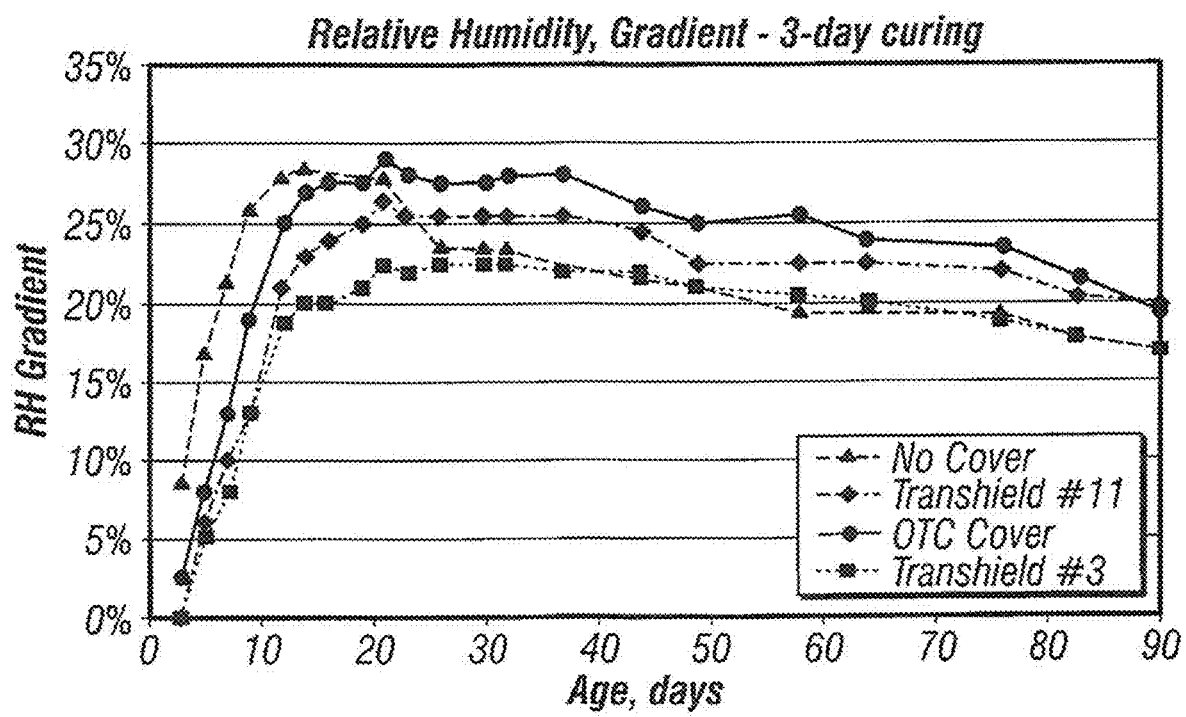
Figure 21:
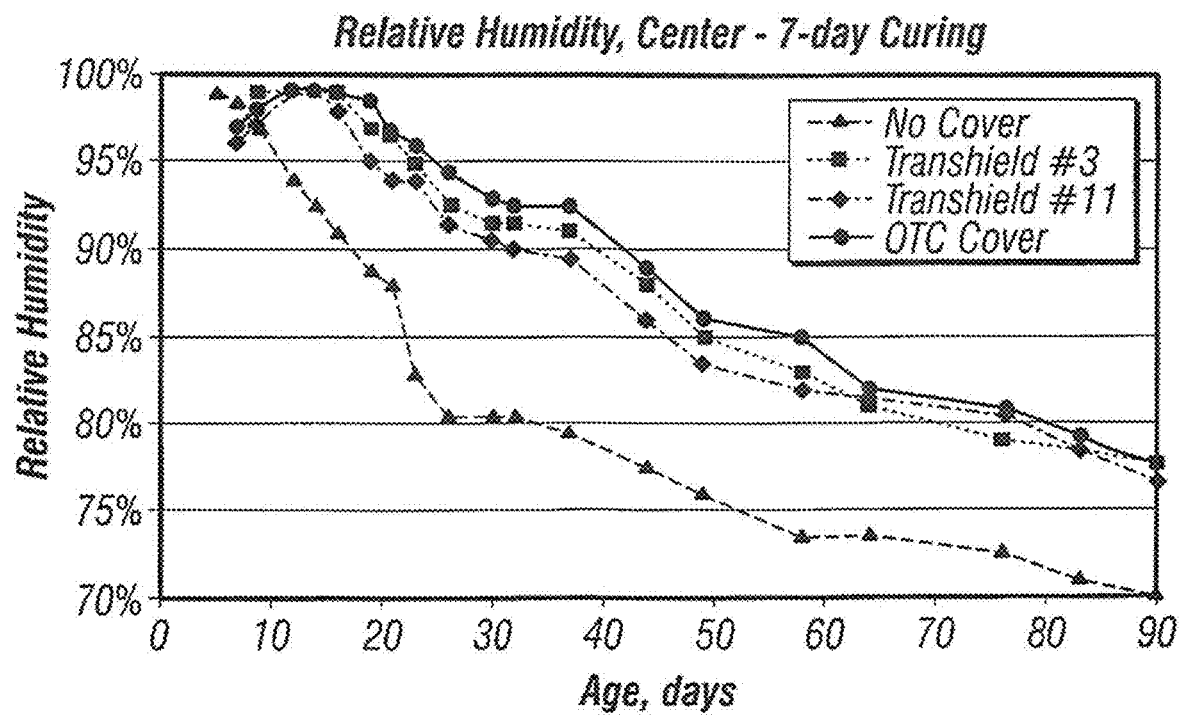
FIGS. 21 and 22 show the results of relative humidity testing performed on samples of concrete slabs cured for 7 days using concreted curing covers according to embodiments of the present invention as compared to other curing techniques.
Figure 22:
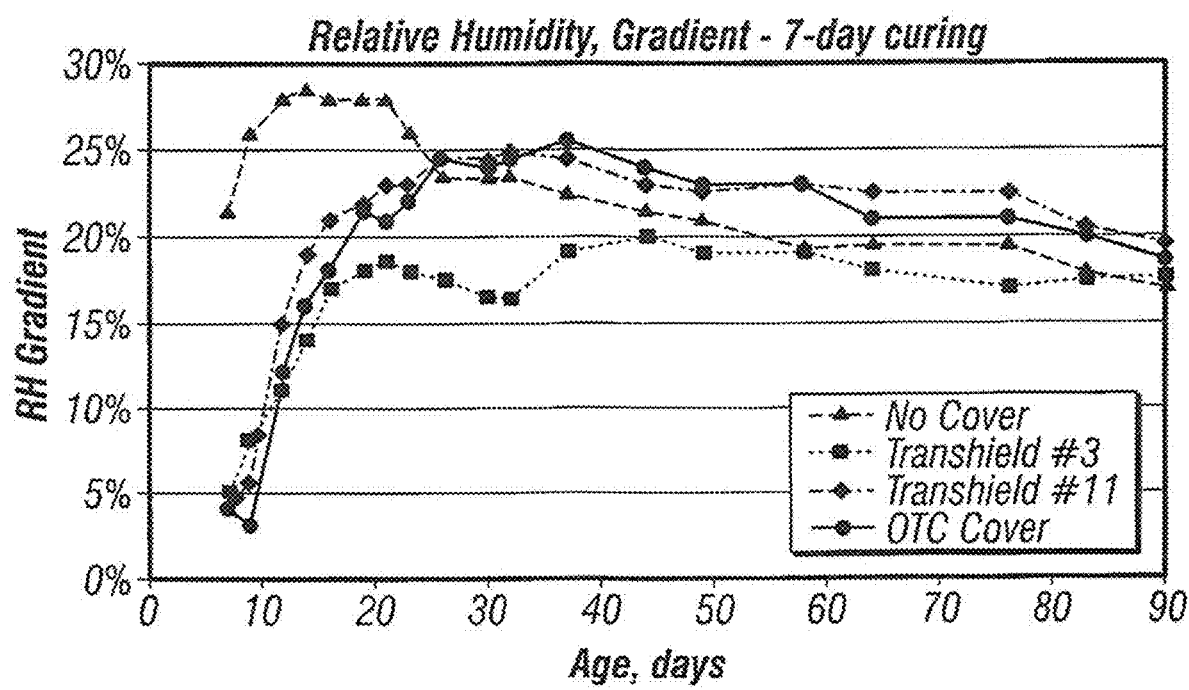

FIGS. 19-22 show the results of relative humidity testing for HPC slabs cured with no cover, a commercially available cover (OTC), a concrete curing cover having a film constructed according to Embodiment #3 of FIG. 10 and a concrete curing cover having a film constructed according to Embodiment #11 of FIG. 10. The test was conducted according to the method described above. The slab that was not covered dried the fastest, having internal relative humidity of 70% after 90 days in the drying room. The slabs cured with the other three covers had roughly the same internal relative humidity throughout the curing process. FIGS. 20-21 show the relative humidity gradient (RH Gradient), which is the ratio of the humidity at the top of the slab to that at the center of the slab. It is desirable to have a lower RH Gradient, as this indicates that moisture is retained within the slab. The relative humidity gradient of the slab cured with the Embodiment #3 cover remained below that of the slabs cured with the other covers throughout essentially the entire curing process.

Figure 23:
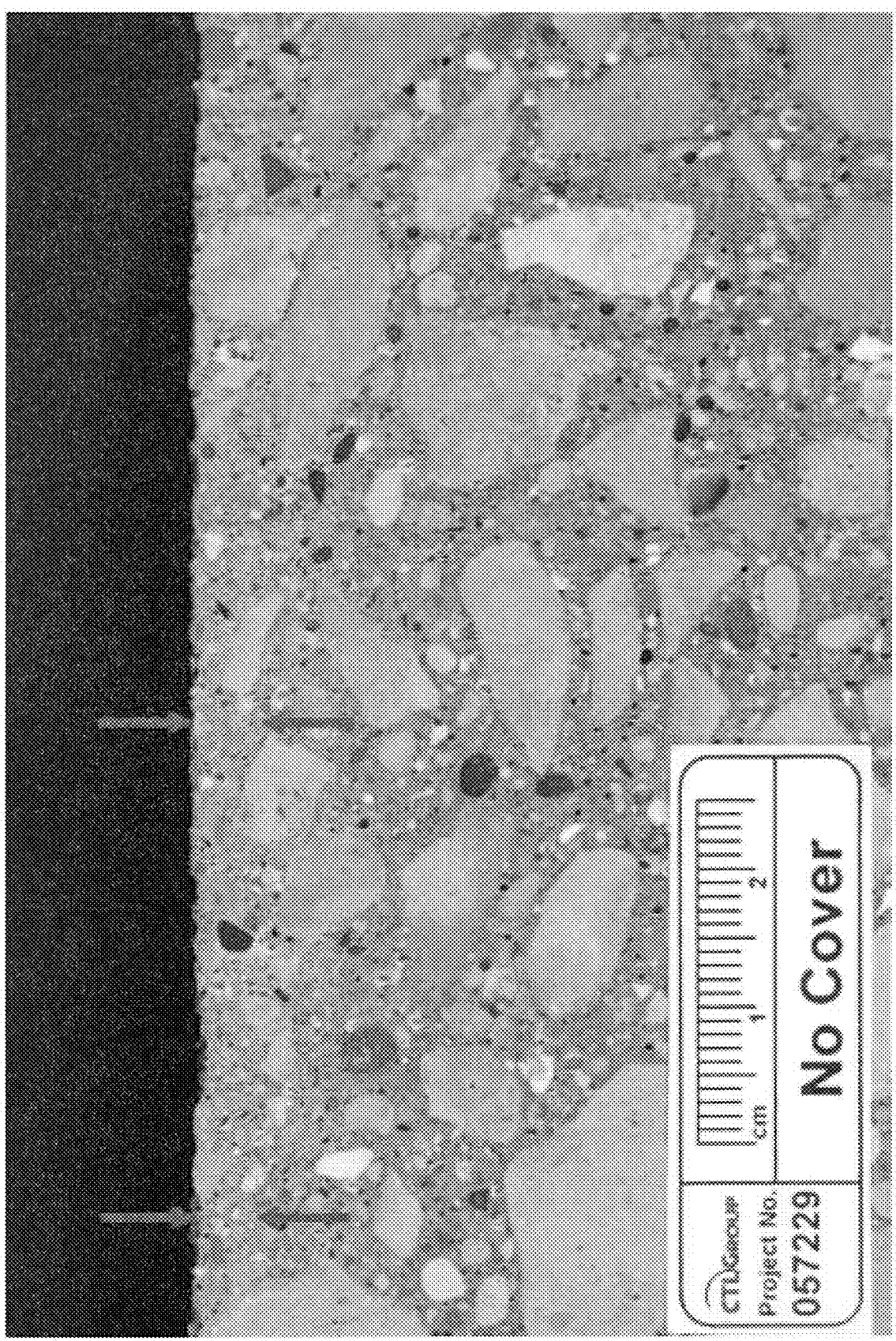
FIG. 23 illustrates a cross-section of a concrete slab that was cured without a cover.
Figure 24:
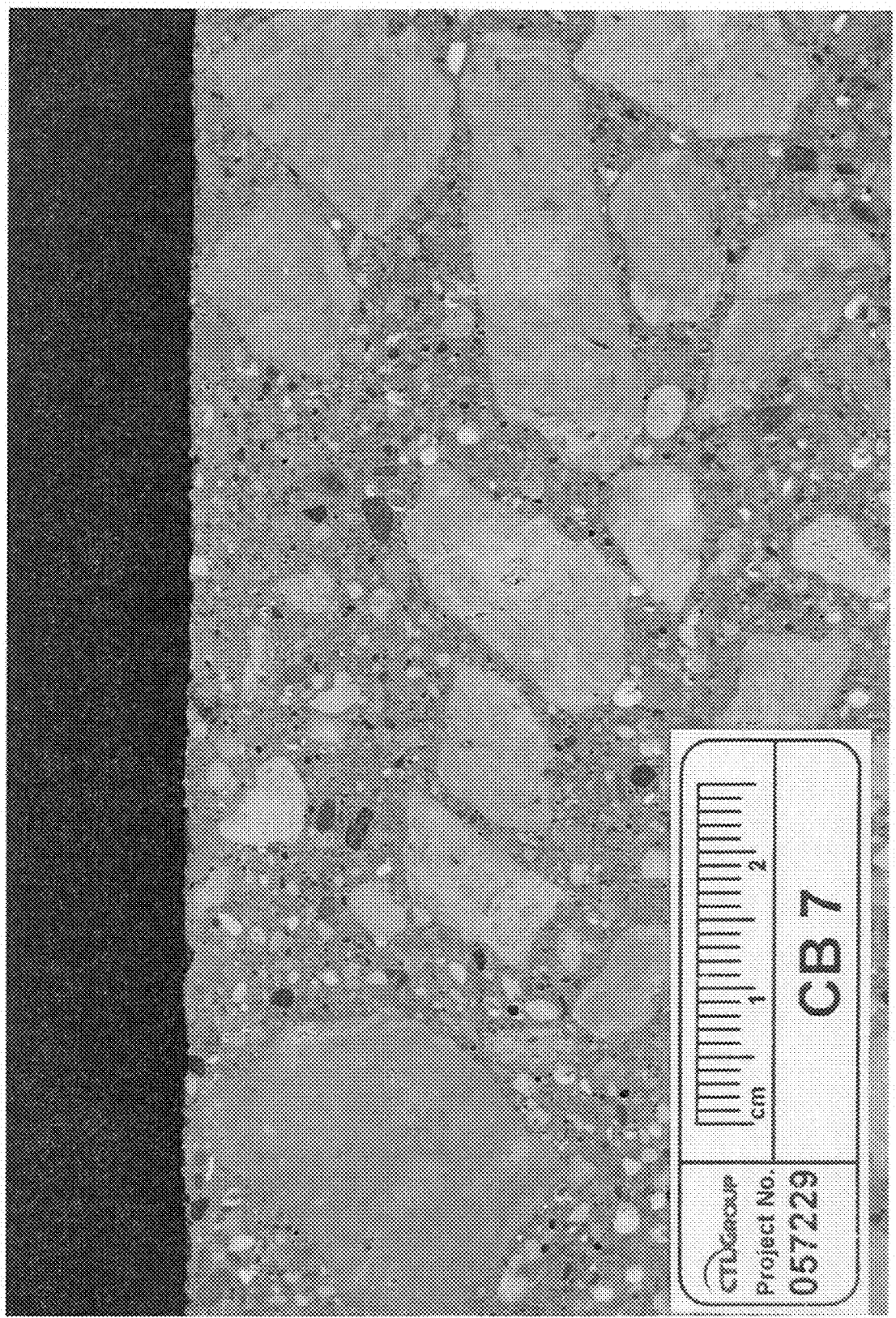
FIG. 24 illustrates a cross-section of a concrete slab that was cured utilizing a concrete curing cover according to one embodiment of the present invention.

FIG. 23 illustrates a cross-section of a concrete slab that was cured without a cover. FIG. 24 illustrates a cross-section of a concrete slab that was cured utilizing a concrete curing cover having a film constructed according to Embodiment #3 of FIG. 10. As shown in the figures, the color of the concrete slab cured without a cover is less uniform than the slab cured with a cover according to one embodiment of the present invention. Specifically, the slab shown in FIG. 23 includes a band of lighter colored material (indicated by the red arrows) near the top of the slab. The slab shown in FIG. 24 does not include a light colored band.

Figure 25:
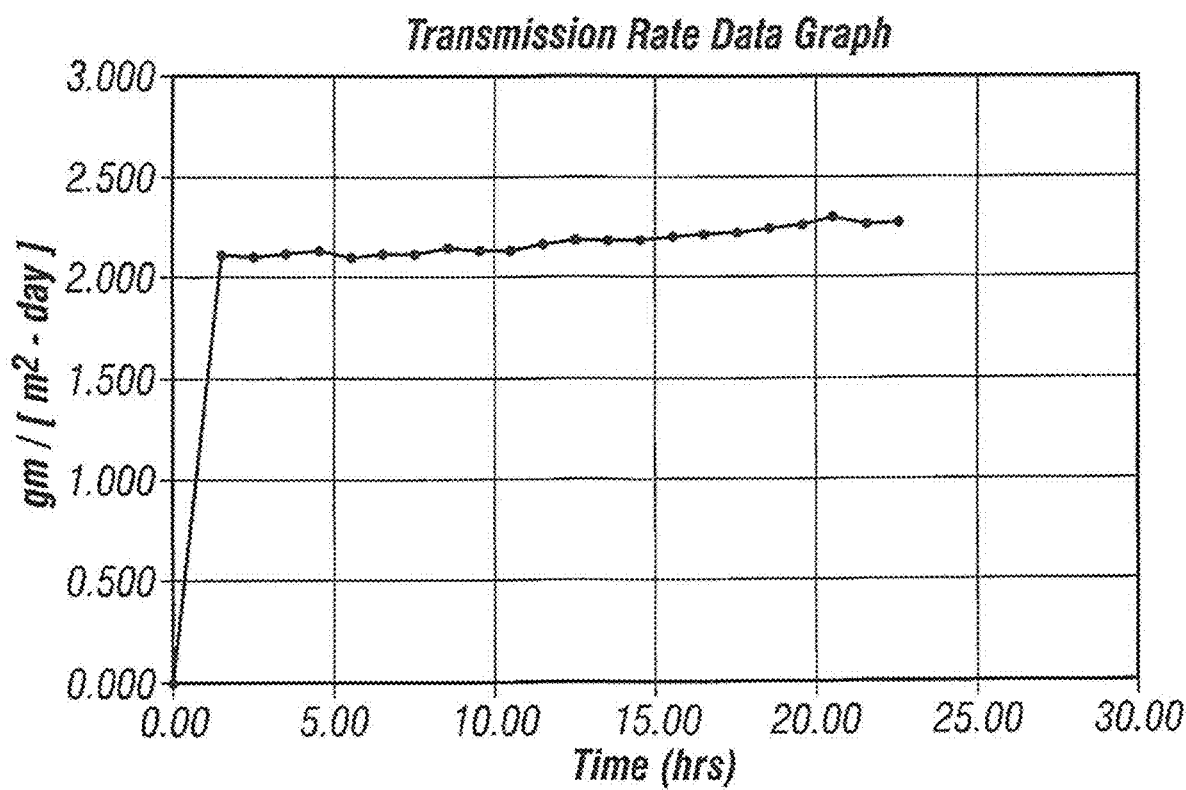
FIG. 25 shows the results of water vapor transmission rate testing performed on a sample of a concrete curing cover according to one embodiment of the present invention.
Figure 26:
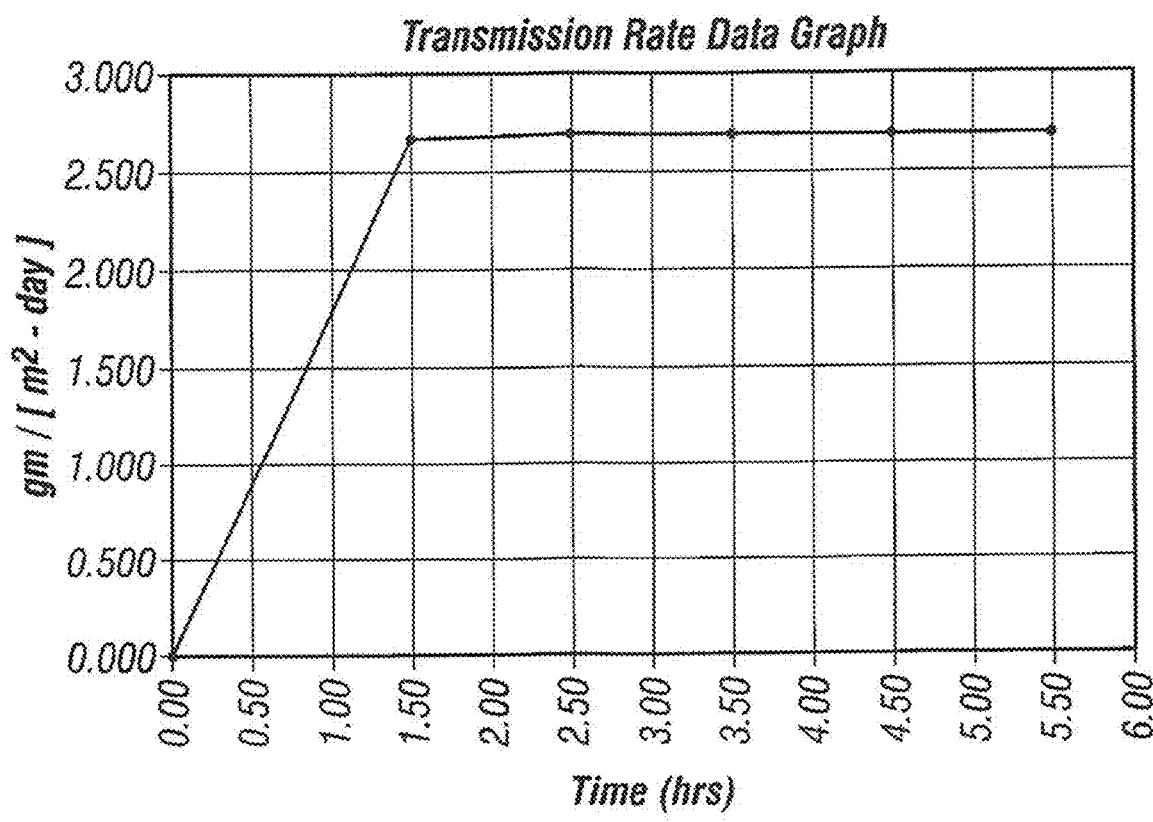
FIG. 26 shows the results of water vapor transmission rate testing performed on a sample of a concrete curing cover according to one embodiment of the present invention.

FIGS. 25 and 26 illustrate the results of water vapor transmission rate testing on embodiments of the present invention. These test results were obtained by utilizing the ASTM F1249 test method. FIG. 25 shows the results for a concrete curing cover having a film constructed according to Embodiment #8 of FIG. 10. As shown in FIG. 25, the water vapor transmission rate for this product is between about 2.2 $g/m^2/24$ h and 2.3 $g/m^2/24$ h after approximately 2 hours. FIG. 26 also shows the results for a concrete curing cover having a film constructed according to Embodiment #8 of FIG. 10. As shown in FIG. 26, the water vapor transmission rate for this product is approximately 2.5 $g/m^2/24$ h after approximately 1.5 hours.

Although the present invention has been shown and described in detail the same is to be taken by way of example only and not by way of limitation. Numerous changes can be made to the embodiments described without departing from the scope of the invention. For example, the film component of the disclosed concrete curing covers is not limited to 3 or 6 layers. Up to at least 9 layer films may be utilized. Additionally, LLDPE can be replaced with low density polyethylene (LDPE) in the embodiments discussed above. Other pH modifying components can also be used. For example, pH modifying components that are about 20% to about 65% of a pH modifying additive and about 35% to about 80% EBA and/or LDPE can be utilized. The various films described above can also be used without an attached absorbent layer to retain water on the curing concrete surface and to modify the pH of the water. Furthermore, the films can be used as a barrier layer between the ground on which the concrete is to be poured and the poured concrete. Such use helps prevent water in the ground from migrating to the poured concrete and further helps to maintain the water in the concrete from migrating to the ground.

What is claimed is:

1. A method of manufacturing an apparatus for curing concrete, including:
 providing a film;
 providing an absorbent material, the absorbent material having a plurality of raised surfaces and a plurality of recessed areas;
 providing an adhesive material;
 heating the film to its crystalline softening point;
 applying the adhesive material to the raised surfaces of the absorbent material; and
 adhering the film to the raised surfaces of the absorbent material so as to form a plurality of pockets between the film and the recessed areas of the absorbent material.

2. The method of claim 1, wherein the film, absorbent material and adhesive material are laminated together.

3. The method of claim 1, wherein the adhesive material is a hot melt adhesive.

4. The method of claim 1, wherein the resulting apparatus has a saturated bond strength of at least about 22 grams per inch.

5. The method of claim 1, further including a step of forming the apparatus into an enclosure for enclosing a concrete member during curing.

6. The method of claim 1, further including a step of incorporating a pH modifying component into the apparatus.

7. The method of claim 6, wherein the pH modifying component is incorporated into the film.

8. The method of claim 6, wherein the pH modifying component is incorporated into the absorbent material.

9. The method of claim 6, wherein the pH modifying component is incorporated into the adhesive material.

10. The method of claim 1, wherein the resulting apparatus has a water vapor transmission rate from the absorbent layer through the film of less than 10 grams per square meter per day.

11. A method of curing of concrete, including:
pouring concrete to a desired shape to form a concrete member;
waiting for the concrete to reach the bleed stage;
applying hydration water to a surface of the poured concrete; and
applying an apparatus over the surface of the concrete after applying the hydration water, the apparatus including a film, an absorbent layer adhered to the film and a pH modifying component for modifying the pH of the hydration water.

12. The method of claim 11, wherein the pH modifying component is incorporated into the film.

13. The method of claim 11, wherein the pH modifying component is incorporated into the absorbent layer.

14. The method of claim 11, wherein the pH modifying component is calcium oxide.

15. The method of claim 11, wherein the pH modifying component modifies the pH of the hydration water to about 11 to about 13.

16. The method of claim 15, further including a step of maintaining the pH of the hydration water above about 11 for at least 7 days.

17. The method of claim 11, wherein the film forms a water vapor barrier on one side of the absorbent layer.

18. The method of claim 11, wherein the water vapor transmission rate of the apparatus from the absorbent layer through the film is less than 10 grams per square meter per day.

19. The method of claim 11, wherein the film includes an antiskid component.

20. The method of claim 11, wherein the apparatus is configured to enclose the concrete member.

21. The method of claim 11, wherein applying the apparatus to the concrete member includes enclosing the concrete member in the apparatus and transporting the enclosed concrete member to a location other than the location at which it was poured, thereby continuing to cure the concrete member during transport.

22. A method of curing of concrete, including:
pouring concrete to a desired shape to form a concrete member; waiting for the concrete to reach the bleed stage; providing hydration water;
adding a pH modifying component to the hydration water; and
applying the hydration water with the pH modifying component to a surface of the poured concrete.

23. The method of claim 22, wherein the pH modifying component is calcium oxide.

24. The method of claim 22, wherein the pH modifying component modifies the pH of the hydration water to about 11 to about 13.

25. The method of claim 22, further including the step of applying an apparatus over the surface of the concrete member after applying the hydration water with the pH modifying component, the apparatus including a film and an absorbent layer adhered to the film.

26. The method of claim 25, wherein the film forms a water vapor barrier on one side of the absorbent layer.

27. The method of claim 25, wherein the water vapor transmission rate of the apparatus from the absorbent layer through the film is less than 10 grams per square meter per day.

28. The method of claim 25, wherein the film includes an antiskid component.

29. The method of claim 25, wherein the apparatus is configured to enclose the concrete member.

\* \* \* \* \*